(12) United States Patent
Hallock et al.

(10) Patent No.: US 11,684,914 B2
(45) Date of Patent: Jun. 27, 2023

(54) METHOD OF TRANSFERRING MATERIAL FROM MICROFABRICATED DEVICE

(71) Applicant: General Automation Lab Technologies Inc., San Carlos, CA (US)

(72) Inventors: Alexander Hallock, San Carlos, CA (US); Peter Christey, San Carlos, CA (US); Jude Dunne, San Carlos, CA (US); Marc Glazer, San Jose, CA (US); Benjamin Lane, Hydes, MD (US); Joshua Gomes, Cambridge, MA (US); Shreyas Ashok, Apex, NC (US); Shao Ning Pei, San Carlos, CA (US)

(73) Assignee: ISOLATION BIO INC., San Carlos, CA (US)

( * ) Notice: Subject to any disclaimer, the term of this patent is extended or adjusted under 35 U.S.C. 154(b) by 303 days.

(21) Appl. No.: 17/179,380

(22) Filed: Feb. 18, 2021

(65) Prior Publication Data
US 2021/0252500 A1    Aug. 19, 2021

Related U.S. Application Data

(60) Provisional application No. 62/978,271, filed on Feb. 18, 2020.

(51) Int. Cl.
*B01L 3/00* (2006.01)
*G01N 35/10* (2006.01)

(52) U.S. Cl.
CPC ............ *B01L 3/5025* (2013.01); *B01L 3/563* (2013.01); *G01N 35/1074* (2013.01);
(Continued)

(58) Field of Classification Search
CPC .. B01L 3/5025; B01L 3/563; B01L 2200/025; B01L 2200/026;
(Continued)

(56) References Cited

U.S. PATENT DOCUMENTS

| 3,915,438 A | 7/1975 | Neiley, Jr. et al. |
| 2017/0136456 A1 | 5/2017 | Chen et al. |

(Continued)

FOREIGN PATENT DOCUMENTS

WO    WO-2018005391 A1 *    1/2018    .............. B01L 3/563

OTHER PUBLICATIONS

International Search Report on PCT/US2021/018633, dated Jun. 15, 2021.

*Primary Examiner* — Jennifer Wecker
*Assistant Examiner* — Kathryn Elizabeth Limbaugh
(74) *Attorney, Agent, or Firm* — Yong Chen; Lin Sun-Hoffman; Liu Chen & Hoffman LLP

(57) ABSTRACT

Methods of transferring material from a first device having an array of microwells to a second device is provided. In some examples, the first device and the second device are moved together toward a stopper plate and impinge on the stopper plate. In other examples, the first device and the second device are kept stationary and an impinging device is impacted on a mounting structure enclosing the first and second devices, causing material transfer from the microwells of the first device to the second device. Apparatus for carrying out the transfer of material is also disclosed.

19 Claims, 20 Drawing Sheets

(52) U.S. Cl.
CPC .... *G01N 35/1081* (2013.01); *B01L 2200/025* (2013.01); *B01L 2200/026* (2013.01); *B01L 2200/141* (2013.01); *B01L 2300/0819* (2013.01); *B01L 2300/0829* (2013.01)

(58) Field of Classification Search
CPC ....... B01L 2200/141; B01L 2300/0819; B01L 2300/0829; G01N 35/1074; G01N 35/1081
See application file for complete search history.

(56) References Cited

U.S. PATENT DOCUMENTS

| | | |
|---|---|---|
| 2018/0008944 A1 | 1/2018 | Ozeki |
| 2019/0170740 A1 | 6/2019 | Wang et al. |
| 2019/0194736 A1 | 6/2019 | Blainey et al. |

\* cited by examiner

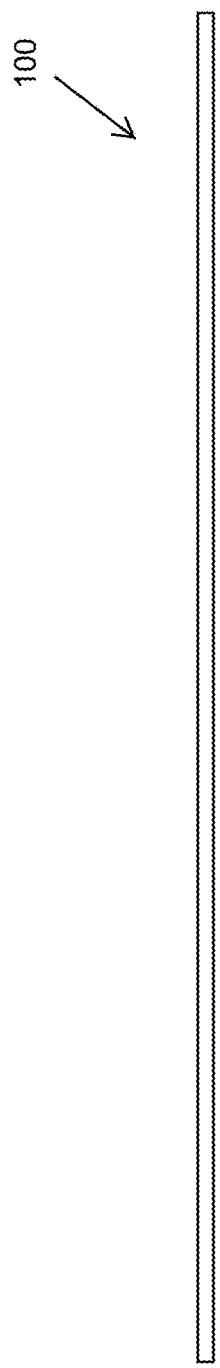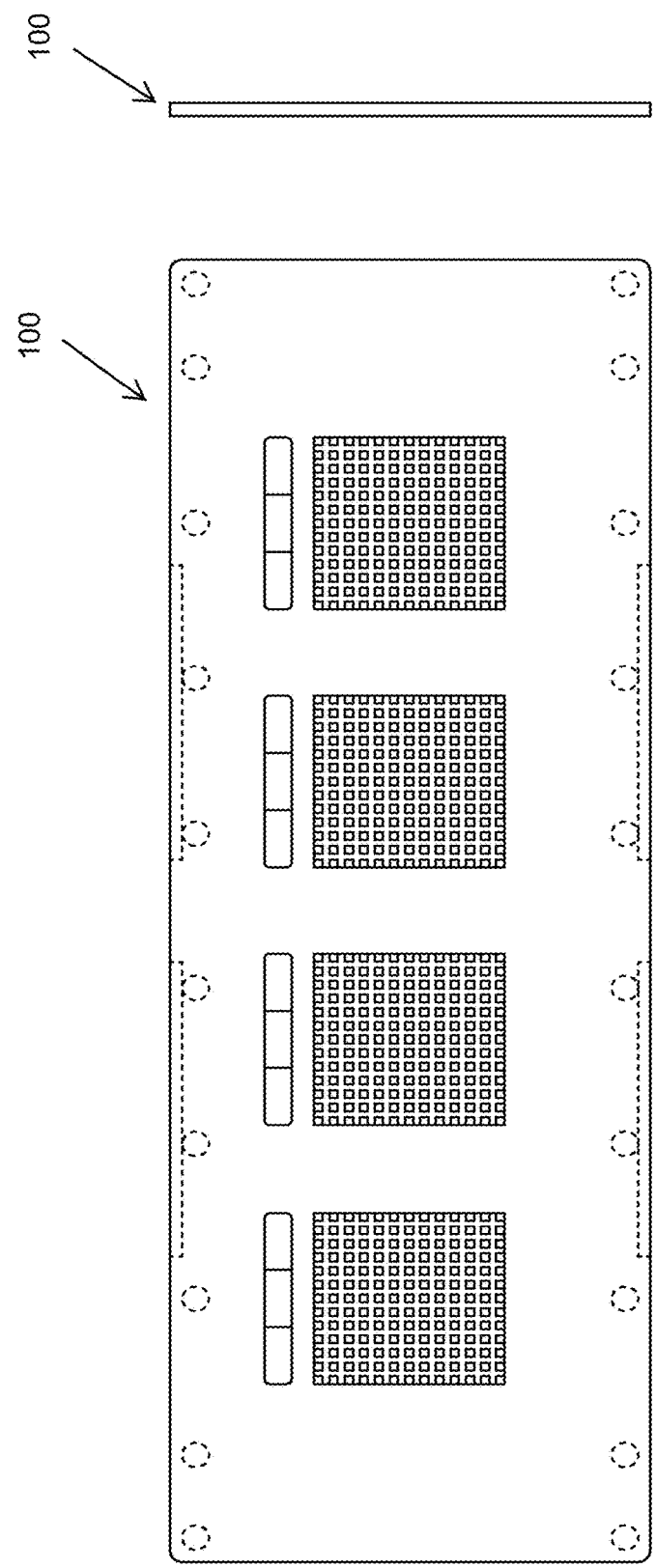
FIG. 2A
FIG. 2B
FIG. 2C

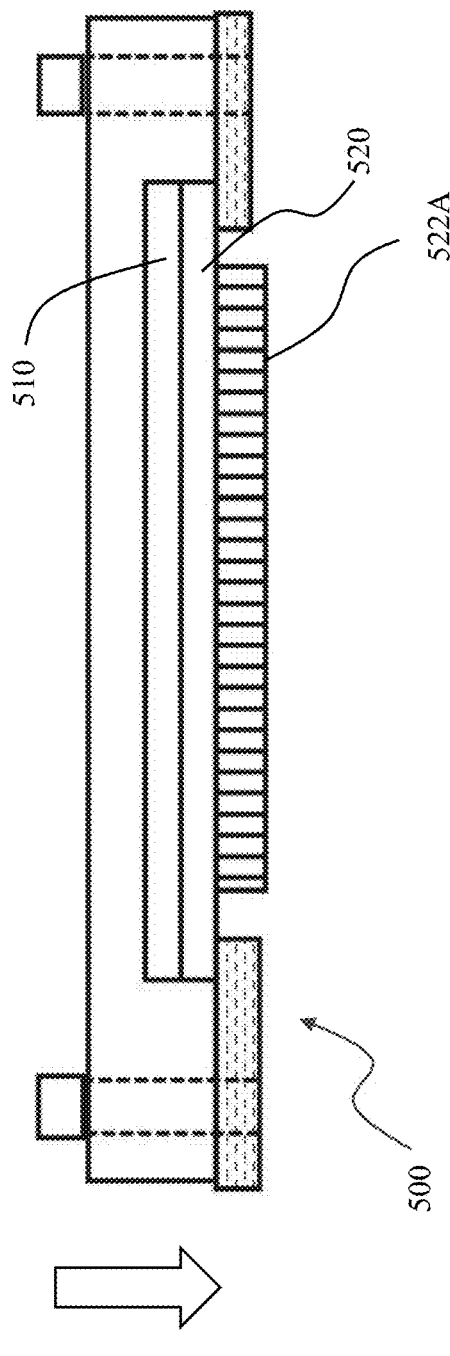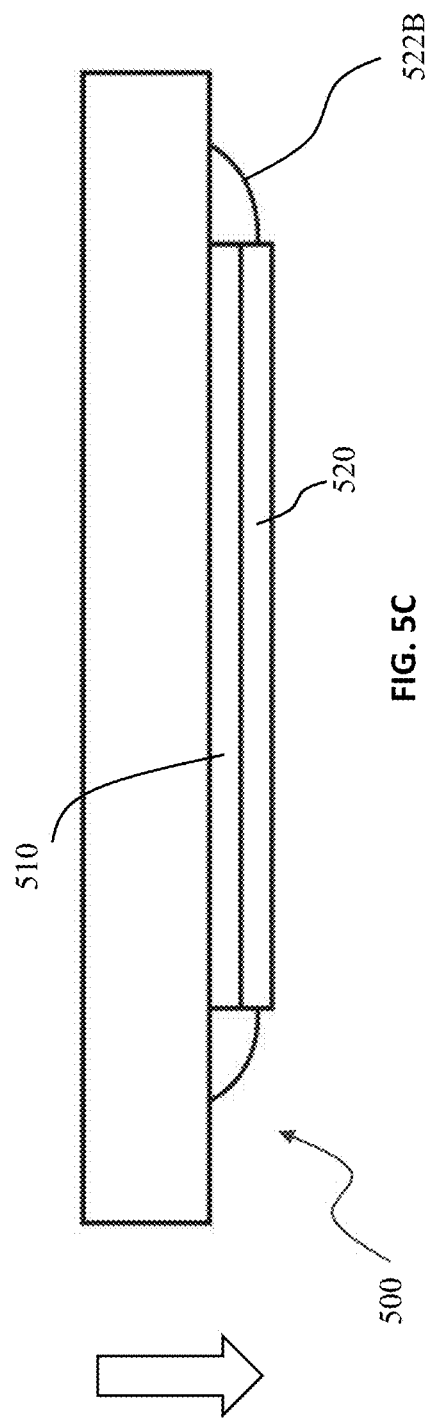

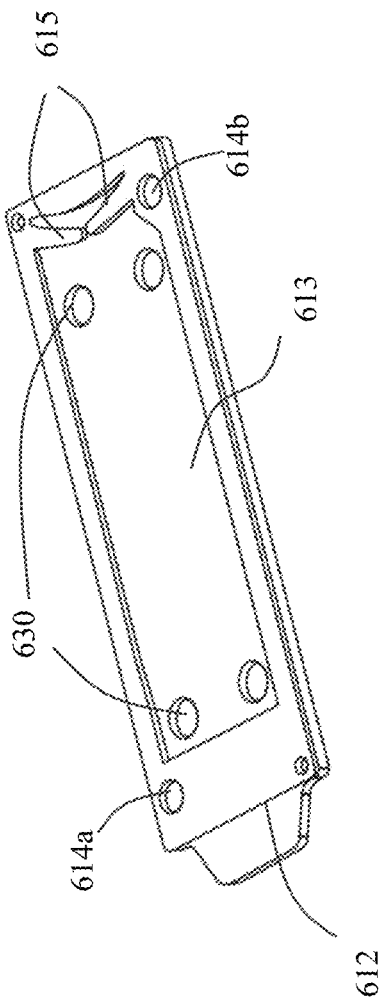
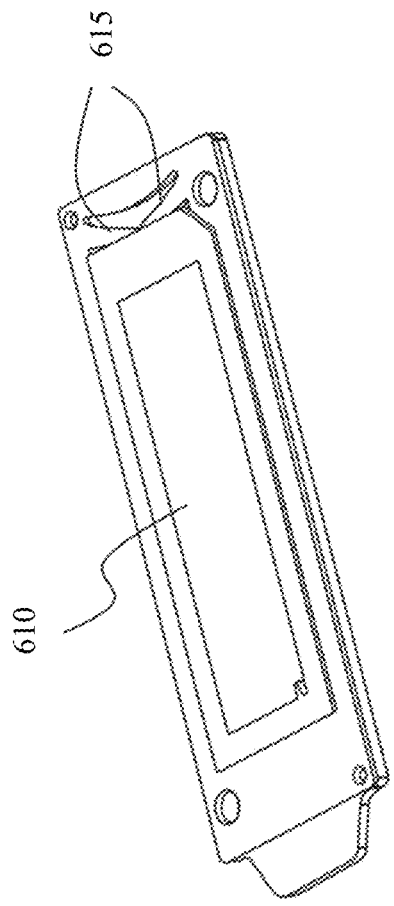
FIG. 6A
FIG. 6B

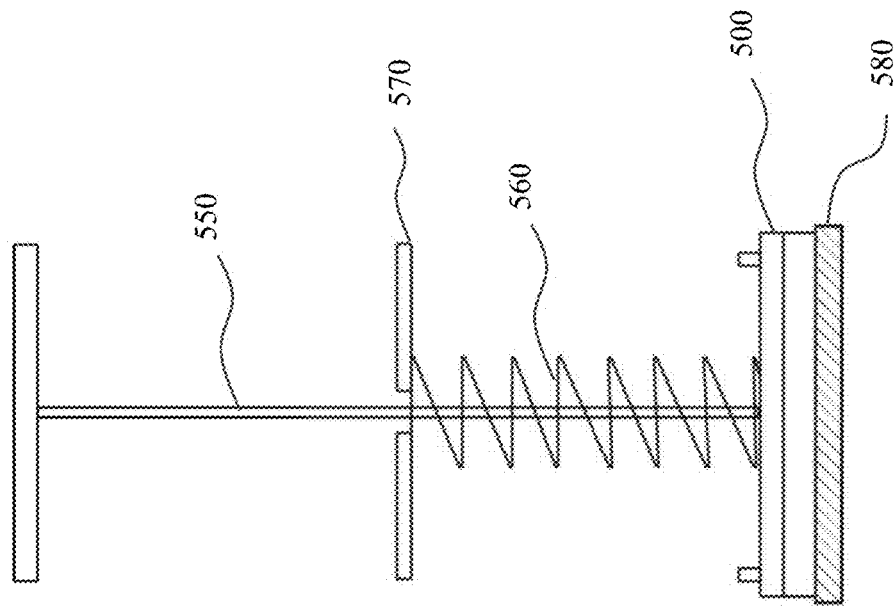
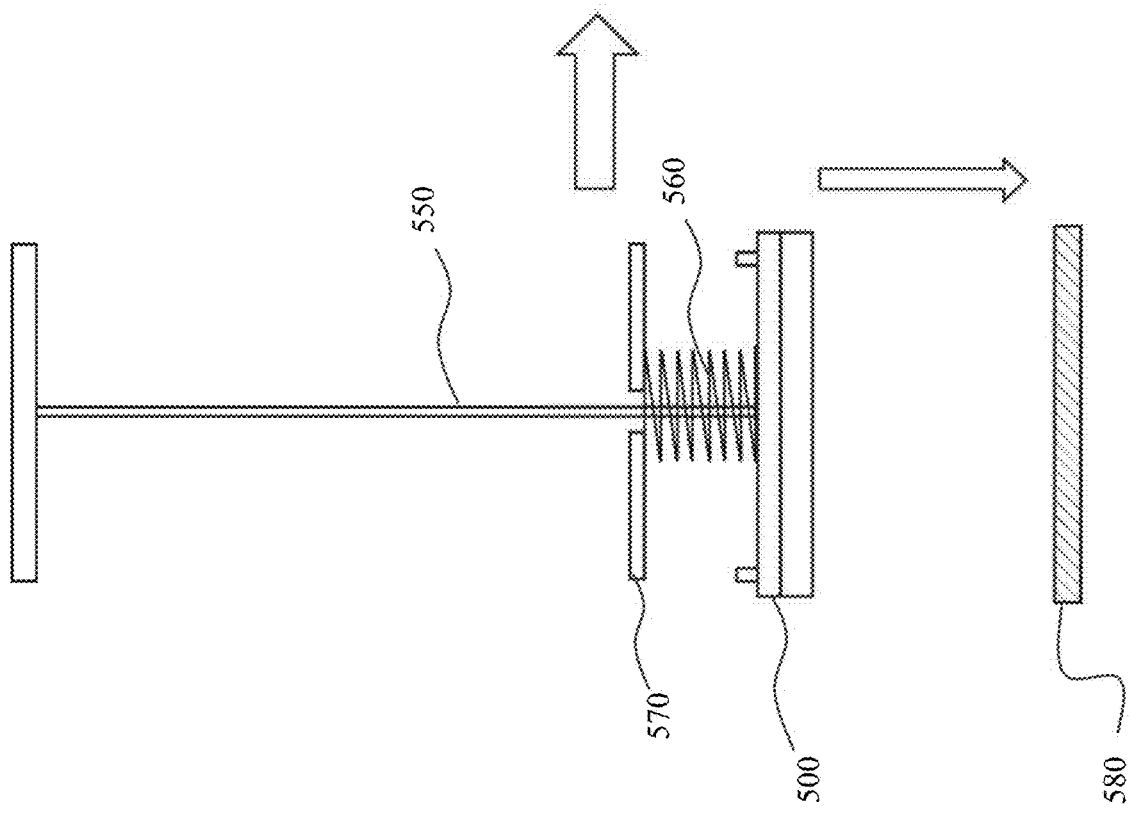
FIG. 8B
FIG. 8A

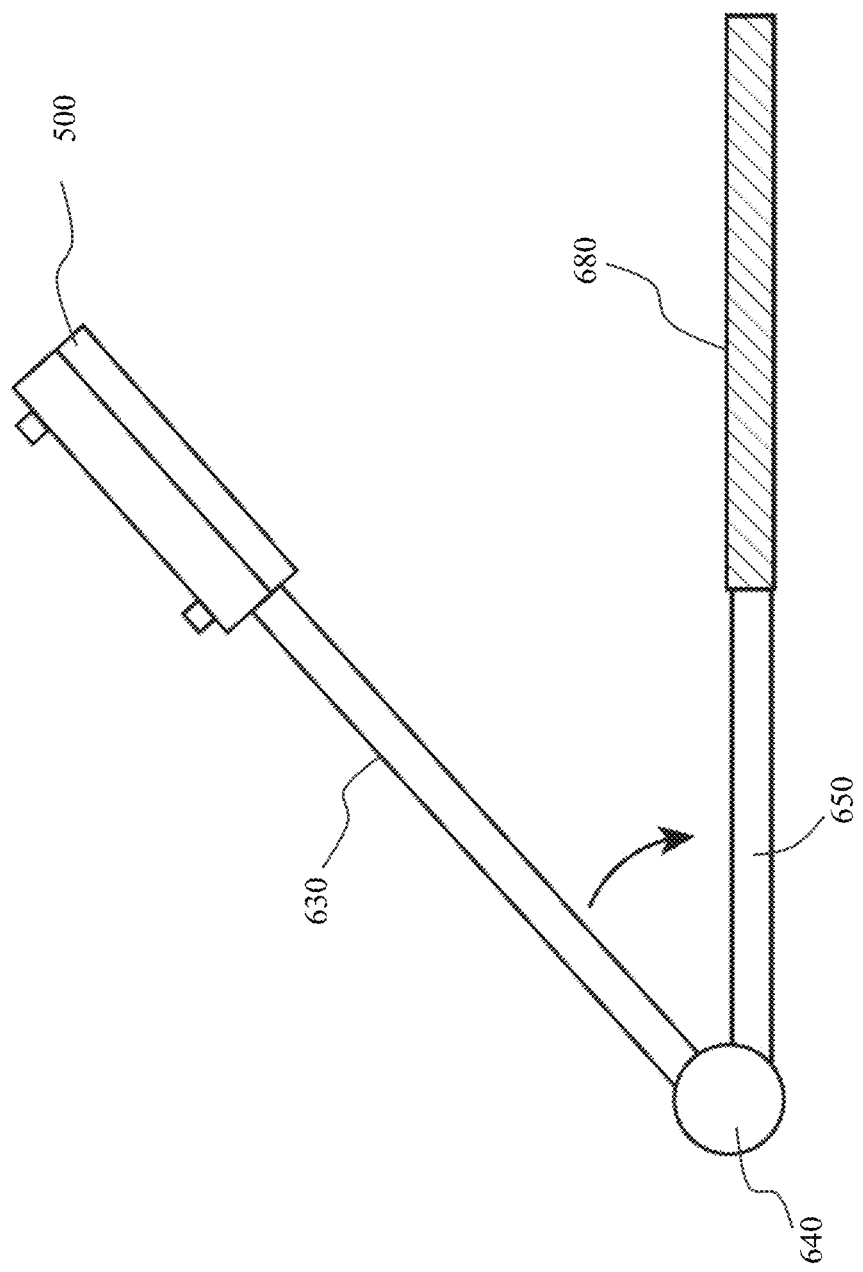

METHOD OF TRANSFERRING MATERIAL FROM MICROFABRICATED DEVICE

CROSS REFERENCE TO RELATED APPLICATION

This application claims the benefit of U.S. Provisional Application No. 62/978,271, filed Feb. 18, 2020, which is incorporated herein by reference in its entirety.

BACKGROUND

It is now widely recognized that microbial communities play significant roles across a diverse range of arenas such as human health and wellness, plant health and productivity, environmental chemistry and oceanic ecosystems. Despite a large body of work that demonstrates the importance of the microbes across these different areas, further understanding of the mechanisms and function in these complex communities is still needed.

Cultures of defined bacteria can be key for the studies of these complex communities and development of microbial products. Traditional approaches of bacterial cultivation, e.g. on plates or in liquid media, are often laborious, time consuming, and biased towards strains with growth advantages such as faster doubling times.

Applicant has developed a new platform utilizing microfabricated chips having high-density array of microwells for high-throughput isolation and cultivation from complex microbiome samples. In such a system, it is often desirable to make a reserve of well contents such that potentially destructive assays can be performed on one copy while retaining the ability to trace back and perform additional or alternative manipulation or tests on the original well contents.

To transfer contents of specific wells to a target location, a precision transfer instrument equipped with microscopic vision and precision robotics can be used by "pipetting" a sample material. However, the transfer throughput can be limited.

For massive parallel duplication of microwell contents of an array of microwells (or of the entire microfabricated chip), simple and high efficiency duplication of contents of multiple microwells, e.g., from a microfabricated chip to another similarly formatted chip, or from a microfabricated chip to another receptacle capable of preserving the physical location information of source of the contents, is desirable.

SUMMARY OF THE INVENTION

In one aspect, the present disclosure provides a method of transferring material from a first device comprising an upper surface including a first array of microwells to a second device comprising an upper surface, wherein at least one of the first array of microwells contain at least one cell, the method comprising: (a) securing an assembly comprising the first device and the second device in a mounting structure, wherein the first device and the second device are positioned in a way that the upper surface of the second device is opposite the upper surface of the first device and the relative positions of the first device and the second device are fixed; and (b) moving the mounting structure carrying the first device and the second device toward a stopper plate, the stopper plate having an initial position apart from the mounting structure, until the assembly or a part of the mounting structure contacts the stopper plate, wherein the speed of the mounting structure immediately before the contact is sufficient to cause the transfer of at least a portion of the well content of the at least one microwell of the first device to the upper surface of the second device. In some embodiments, the second device is disposed closer to the stopper plate than the first device. In other embodiments, the first device is disposed closer to the stopper plate than the second device.

In another aspect, a method of transferring material from a first device comprising an upper surface including a first array of microwells to a second device comprising an upper surface, wherein at least one of the first array of microwells contain at least one cell, the method comprising: (a) securing an assembly comprising the first device and the second device in a mounting structure, wherein the first device and the second device are positioned in a way that the upper surface of the second device is opposite the upper surface of the first device and the relative positions of the first device and the second device are fixed; and (b) moving an impinging device toward the assembly, wherein the impinging device has an initial position apart from the assembly, until the impinging device contacts the assembly or a part of the mounting structure, wherein the momentum of the impinging device immediately before the contact is sufficient to cause the transfer of at least a portion of the well content of the at least one microwell of the first device to the upper surface of the second device. In some embodiments, the first device is disposed closer to the impinging device than the second device. In other embodiments, the second device is disclosed closer to the impinging device than the first device.

In some embodiments, the upper surface of the second device comprises a second array of microwells, and securing the assembly further can include aligning at least one microwell of the first array of microwells of the first device with at least one microwell of the second array of microwells of the second device.

In some embodiments, the upper surface of the second device can include a conducting substrate. In some of such embodiments, the second device can further include a MALDI matrix material deposited on top of the conducting substrate.

In some embodiments, the content in the at least one microwell of the first device can include liquid and at a plurality of cells.

In some embodiments, the mounting structure is configured such that moving the mounting structure toward the stopper plate causes direct contact between the second device with the stopper plate.

In some embodiments, the mounting structure can be slidable along a guide rail, and wherein moving the assembly includes moving the assembly along the guide rail.

In some embodiments, the mounting structure is configured to be movable along a curve toward the stopper plate.

In some embodiments, the mounting structure includes a thin film interposed between the second device and the stopper plate.

In some embodiments, positioning the first device and the second device comprises contacting the upper surface of the first device with the upper surface of the second device.

In some embodiments, the surface density of the first array of microwells is at least 150 microwells per $cm^2$, at least 250 microwells per $cm^2$, at least 400 microwells per $cm^2$, at least 500 microwells per $cm^2$, at least 750 microwells per $cm^2$, at least 1,000 microwells per $cm^2$, at least 2,500 microwells per $cm^2$, at least 5,000 microwells per $cm^2$, at least 7,500 microwells per $cm^2$, at least 10,000 microwells per $cm^2$, at least 50,000 microwells per $cm^2$, at least 100,000 microwells per $cm^2$, or at least 160,000 per $cm^2$. In some embodiments, each microwell of the first array of microwells of the first device has a diameter of from about 5 µm to about 500 µm, from about 10 µm to about 300 µm, or from about 20 µm to about 200 µm.

In some embodiments, there is provided a method of transferring material from a first device comprising an upper surface including a first array of microwells to a second device comprising an upper surface, the method comprising: (a) securing an assembly comprising the first device and the second device in a mounting structure, wherein the first device and the second device are positioned in a way that the upper surface of the second device is opposite the upper surface of the first device and the relative positions of the first device and the second device are fixed; (b) moving the mounting structure toward a stopper plate, the stopper plate having an initial position apart from the mounting structure, wherein the second device is disposed more distally to the stopper plate than the first device, until the first device or a part of the mounting structure contacting the stopper plate wherein the speed of the mounting structure immediately before the contact is sufficient so as to cause the transfer of at least a portion of the well content of the at least one microwell of the first device to the upper surface of the second device.

In some embodiments, there is provided a method of transferring material from a first device comprising an upper surface including a first array of microwells to a second device comprising an upper surface, the method comprising: (a) securing an assembly comprising the first device and the second device in a mounting structure, wherein the first device and the second device are positioned in a way that the upper surface of the second device is opposite the upper surface of the first device and the relative positions of the first device and the second device are fixed; (b) impacting the first device or the second device with sufficient momentum to cause the transfer of at least a portion of the well content of the at least one microwell of the first device to the upper surface of the second device.

In another aspect, an apparatus for transferring material from microwells of a first device to a second device is provided, which includes a mounting structure configured to securely hold a first device and the second device together; a stopper plate spaced apart from the mounting structure; wherein the mounting structure is movable relative to the stopper plate in a controlled fashion and is capable of achieving a predetermined speed when the mounting structure comes to contact the stopper plate. In some embodiments, the apparatus further includes a guide rail, wherein the mounting structure is configured to slidably move along the guide rail in a linear fashion. In some embodiments, the mounting structure is configured to move relative to the stopper plate in a swing fashion.

In a further aspect, an apparatus for transferring material from microwells of a first device to a second device is provided. The apparatus includes a mounting structure configured to securely hold a first device and the second device together; an impinging device; a spring coupled with the impinging device; wherein the spring is switchable from a compressed state and a relaxed state; and wherein the apparatus is configured to be capable of: compressing the spring, thereby moving the impinging device away from the mounting structure; and allowing the compressed spring to decompress, thereby causing the impinging device to move toward the mounting structure and ultimately contacting a portion of the mounting structure or the first device. In some embodiments of the apparatus, the impinging device comprises an anvil portion having a plurality of discrete sections of surfaces. In some embodiments, the apparatus further includes a motor configured to engage a part of the impinging device, thereby compressing the spring.

BRIEF DESCRIPTION OF THE DRAWINGS

FIGS. 2A-2C are top, side, and end views, respectively, illustrating dimensions of microfabricated device or chip in accordance with some embodiments.

FIG. 5B is an alternative illustrative structure of a mounting structuring in which a donor array and a receiver array are mounted, according to some embodiments of the present invention.

FIG. 5C is another alternative illustrative structure of a mounting structuring in which a donor array and a receiver array are mounted, according to some embodiments of the present invention.

FIG. 6A shows an example structure of a clamshell clamp to hold a donor (or receiver) array, according to some embodiments of the present invention.

FIG. 6B shows an example structure of a clamshell clamp with a donor (or receiver) array installed thereon, according to some embodiments of the present invention.

FIGS. 8A and 8B are schematic illustrations of a portion of an apparatus to transfer material from wells of a donor array to a receiver array according to some embodiments of the present invention, where FIG. 8A shows the status of the apparatus before impact and FIG. 8B shows the status of the apparatus upon impact.

FIG. 9 is a schematic illustration of a portion of an apparatus to transfer material from wells of a donor array to a receiver array, according to alternative embodiments of the present invention.

FIG. 11A shows the status of the apparatus before impact and FIG. 11B shows the status of the apparatus upon impact.

DESCRIPTION OF EMBODIMENTS OF THE INVENTION

Figure 1:
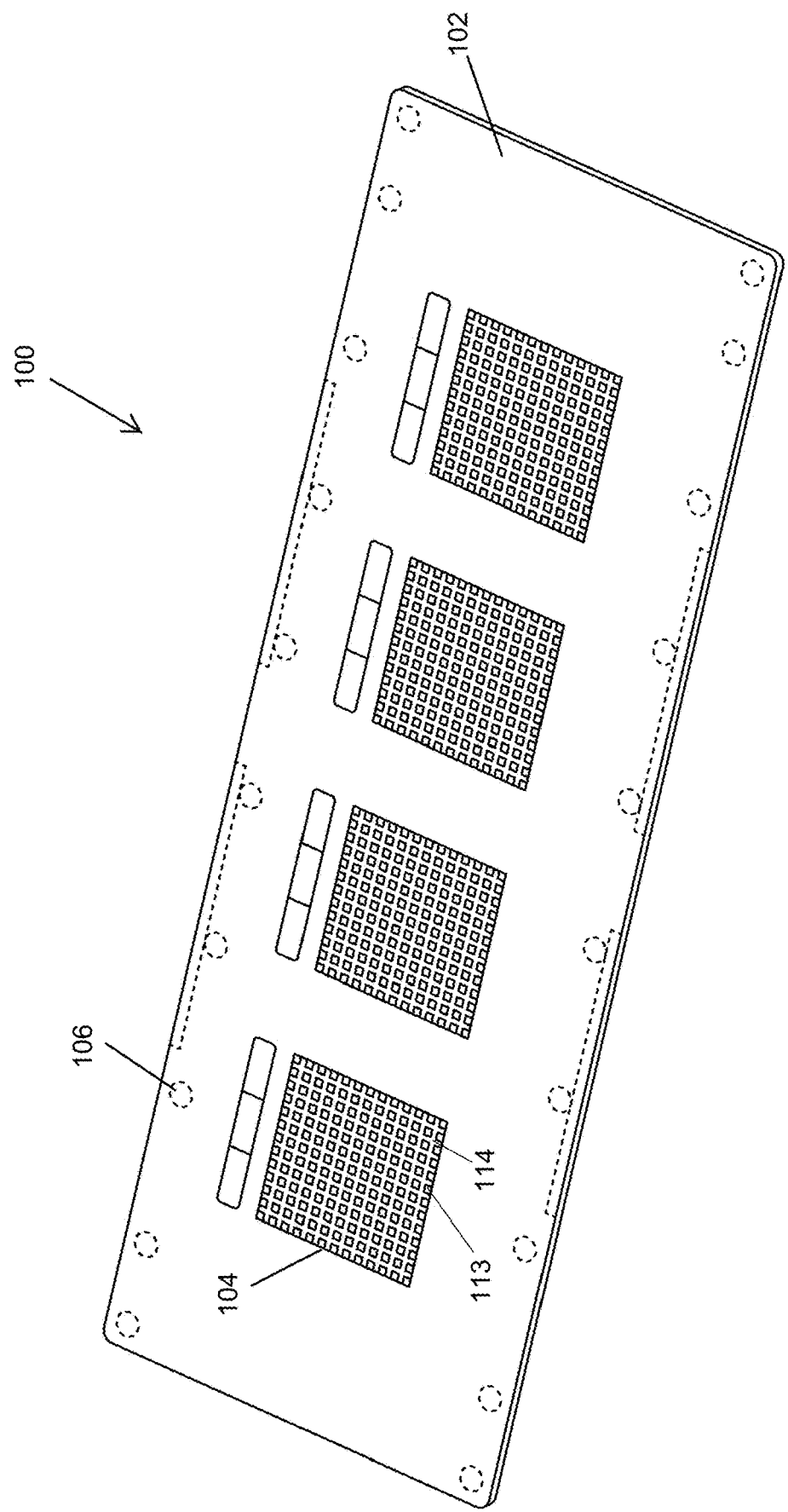
FIG. 1 is a perspective view illustrating a microfabricated device or chip in accordance with some embodiments.

An object of the present invention is to generate a duplicate copy of the contents of an array of microwells of a microfabricated device containing materials of interest, e.g. microbial culture. With a copy reserved, the new copy or the original array can be used to perform potentially destructive tests to identify or screen materials of interest. If any materials of interest are identified from the tests, further cultivation/growth, harvesting, or other actions may be taken on the reserved copy.

In one aspect, the present disclosure provides a method of transferring material from a first device comprising an upper surface including a first array of microwells to a second device comprising an upper (or receiving) surface which may include a corresponding array of microwells. In the method, the first device and the second device are assembled and mounted in a mounting structure, wherein the first device and the second device are positioned in a way that the upper surface of the second device is opposite the upper surface of the first device and the relative positions of the first device and the second device are fixed. The fixation between the first device and the second device may be accomplished by clamping, adhesion, or frictional force.

In some embodiments, the mounting structure (with the first and second device mounted thereon or therein) is then moved toward a stationary stopper plate. Before the move, the stopper plate has an initial position apart from the mounting structure (in the assembly the second device is preferably disposed more proximally to the stopper plate than the first device). The mounting structure is moved relative toward the stopper plate until the second device or a part of the mounting structure contacts the stopper plate at a sufficient speed so as to cause the transfer of at least a portion of the well content of the at least one microwell (or a plurality of microwells) of the first microfabricated device to the upper surface of the second device. Alternatively, the transfer can also be accomplished by placing the second device more distally to the stopper plate, and at the impact the first device may directly contact the stopper plate. While the stopper plate can be held still for the process and the mounting structure is moved toward the stopper plate, it is also possible to hold the mounting structure still and moving the stopper plate or another object toward the mounting structure to effect the impact. The momentum of the stopper plate or the other object should be sufficient to cause the transfer of material from the first device and second device. For convenience, the first device is also referred to as an "array" or "donor array", or "donor chip", or "donor device" herein.

In other embodiments, the mounting structure (with the first and second device mounted thereon or therein) is kept still and an impacting device is moved from a position away from the assembly toward the assembly, until the impacting device impinges on the mounting structure or the assembly with sufficient speed/momentum to transfer at least a portion of the well contents of the microwells of the first device to the upper surface (e.g., to the corresponding microwells) of the second device.

In some embodiments, the method further comprises performing analysis, test(s) and/or assay(s) on the materials transferred to the second device to identify the presence of a biological entity of interest, and based on the location of the transferred material on the second device, determining the source microwell(s) from which the material has been transferred from. Further treatment, manipulation, test, assay, screening, or other handling may be performed on the contents of the source microwell(s).

Each of the first device and the second device can have two major substantially planar surfaces parallel to each other, one upper surface and one bottom surface. The second device can have a configuration similar to that of the first device with array of microwells, or its upper surface can be flat without microwell features (like that of a glass slide). In the former case, certain predetermined microwells of the second device can be aligned with those of the first device, and the transfer results in a portion of the materials from the first array of microwells entering into the corresponding aligned microwells of the second device. In the latter case, no exact alignment may be needed, where the transfer results in a portion of the materials from the first array of microwells being "ejected" out of the microwells and landing on the upper surface of the second device. In either case, the upper surface of the second device can comprise a conducting substrate such as a metal on which an organic or inorganic matrix layer can be deposited. Such matrix layer may comprise material commonly used as matrix layer for the ionization under Matrix-Assisted Laser Desorption/Ionization (MALDI), which includes compounds that are crystalline with low molecular weight, have strong absorption at some laser wavelength (mostly UV or IR), and tend to be polar so they are water soluble, e.g., cinnamic or benzoic acid derivatives.

In other embodiments, the second device can comprise a surface layer containing tags such as oligonucleotides or peptides that bind preferably or specifically with biological targets.

At least some, or each of the microwells of the first device can include liquid and at least one cell, preferably a plurality of cells, such as one or more eukaryotic cells or prokaryotic cells (such as bacterial cells). It may have additional components for cell cultivation or assay such as a nutrient, a culture media, a buffer, a reagent, a bead, an enzyme, a primer, a PCR mastermix, a colorimetric dye, a fluorescent probe, a peptide, an antibody, etc. The upper surface of the second device can be empty before the transfer, or may be preloaded with cells, media, nutrient, reagent, etc., before the transfer.

The disclosed method can largely eliminate cross contamination between adjacent wells and between the first device (or donor device or donor array) and the second device (also referred to as the "receiver" device or array. Also, by adjusting the speed of the relative movement between the device assembly and the stopper plate (or between the impacting device and the device assembly, as the case may be) immediately before impact, a portion of well content of the microwells of the donor array can be transferred to the destination wells or locations on the upper surface of the second device while some amount of sample in the microwells in the donor array are retained.

As used herein, a microfabricated device or chip is a device on which a high density array of microwells (or experimental units) are defined. For example, a microfabricated chip comprising a "high density" of microwells may include about 150 microwells per $cm^2$ to about 160,000 microwells or more per $cm^2$ (for example, at least 150 microwells per $cm^2$, at least 250 microwells per $cm^2$, at least 400 microwells per $cm^2$, at least 500 microwells per $cm^2$, at least 750 microwells per $cm^2$, at least 1,000 microwells per $cm^2$, at least 2,500 microwells per $cm^2$, at least 5,000 microwells per $cm^2$, at least 7,500 microwells per $cm^2$, at least 10,000 microwells per $cm^2$, at least 50,000 microwells per $cm^2$, at least 100,000 microwells per $cm^2$, or at least 160,000 microwells per $cm^2$). A substrate of a microfabricated chip may include about or more than 10,000,000 microwells or locations. For example, an array of microwells may include at least 96 locations, at least 1,000 locations, at least 5,000 locations, at least 10,000 locations, at least 50,000 locations, at least 100,000 locations, at least 500,000 locations, at least 1,000,000 locations, at least 5,000,000 locations, or at least 10,000,000 locations. The arrays of microwells may form grid patterns, and be grouped into separate areas or sections. The dimensions of a microwell may range from nanoscopic (e.g., a diameter from about 1 to about 100 nanometers) to microscopic. For example, each microwell may have a diameter of about 1 μm to about 800 μm, a diameter of about 25 μm to about 500 μm, or a diameter of about 30 μm to about 100 μm. A microwell may have a diameter of about or less than 1 μm, about or less than 5 μm, about or less than 10 μm, about or less than 25 μm, about or less than 50 μm, about or less than 100 μm, about or less than 200 μm, about or less than 300 μm, about or less than 400 μm, about or less than 500 μm, about or less than 600 μm, about or less than 700 μm, or about or less than 800 μm. In exemplary embodiments, the diameter of the microwells can be about 100 μm or smaller, or 50 μm or smaller. A microwell may have a depth of about 25 μm to about 100 μm, e.g., about 1 μm, about 5 μm, about 10 μm, about 25 μm, about 50 μm, about 100 μm. It can also have greater depth, e.g., about 200 μm, about 300 μm, about 400 μm, about 500 μm. The spacing between adjacent microwells can range from about 25 μm to about 500 μm, or about 30 μm to about 100 μm.

A microfabricated chip can have two major surfaces: a top surface and a bottom surface, each of which can be substantially planar and parallel to each other, where the microwells have openings at the top surface. Each microwell of the microwells may have an opening or cross section having any shape, e.g., round, hexagonal, square, or other shapes. Each microwell may include sidewalls. For microwells that are not round in their openings or cross sections, the diameter of the microwells described herein refer to the effective diameter of a circular shape having an equivalent area. For example, for a square shaped microwell having side lengths of 10×10 microns, a circle having an equivalent area (100 square microns) has a diameter of 11.3 microns. Each microwell may include a sidewall or sidewalls. The sidewalls may have a cross-sectional profile that is straight, oblique, and/or curved. Each microwell includes a bottom which can be flat, round, or of other shapes. The microfabricated chip (with the microwells thereon) may be manufactured from a polymer, e.g., a cyclic olefin polymer, via precision injection molding or some other process such as embossing. Other material of construction is also available, such as silicon and glass. FIG. 1 shows a schematic depiction of a microfabricated chip, whose edges are generally parallel to the directions of the rows and the columns of the microwells on the chip.

The microfabricated chip suitable for the present invention can be made of molded engineering plastic which has excellent strength and rigidity to withstand mechanical impact without significant deformation.

The high density microwells on the microfabricated chip can be used for receiving a sample comprising at least one biological entity (e.g., at least one cell). The term "biological entity" may include, but is not limited to, an organism, a cell, a cell component, a cell product, and a virus, and the term "species" may be used to describe a unit of classification, including, but not limited to, an operational taxonomic unit (OTU), a genotype, a phylotype, a phenotype, an ecotype, a history, a behavior or interaction, a product, a variant, and an evolutionarily significant unit. The high density microwells on the microfabricated chip can be used to conduct various experiments, such as growth or cultivation or screening of various species of bacteria and other microorganisms (or microbes) such as aerobic, anaerobic, and/or facultative aerobic microorganisms. The microwells may be used to conduct experiments with eukaryotic cells such as mammalian cells. Also, the microwells can be used to conduct various genomic or proteomic experiments, and may contain cell products or components, or other chemical or biological substances or entities, such as a cell surface (e.g., a cell membrane or wall), a metabolite, a vitamin, a hormone, a neurotransmitter, an antibody, an amino acid, an enzyme, a protein, a saccharide, ATP, a lipid, a nucleoside, a nucleotide, a nucleic acid (e.g., DNA or RNA), a chemical, e.g., a dye, enzyme substrate, etc.

In various embodiments, a cell may be Archaea, Bacteria, or Eukaryota (e.g., fungi). For example, a cell may be a microorganism, such as an aerobic, anaerobic, or facultative aerobic microorganisms. A virus may be a bacteriophage. Other cell components/products may include, but are not limited to, proteins, amino acids, enzymes, saccharides, adenosine triphosphate (ATP), lipids, nucleic acids (e.g., DNA and RNA), nucleosides, nucleotides, cell membranes/walls, flagella, fimbriae, organelles, metabolites, vitamins, hormones, neurotransmitters, and antibodies.

For the cultivation of cells, a nutrient can be provided. A nutrient may be defined (e.g., a chemically defined or synthetic medium) or undefined (e.g., a basal or complex medium). A nutrient may include or be a component of a laboratory-formulated and/or a commercially manufactured medium (e.g., a mix of two or more chemicals). A nutrient may include or be a component of a liquid nutrient medium (i.e., a nutrient broth), such as a marine broth, a lysogeny broth (e.g., Luria broth), etc. A nutrient may include or be a component of a liquid medium mixed with agar to form a solid medium and/or a commercially available manufactured agar plate, such as blood agar.

A nutrient may include or be a component of selective media. For example, selective media may be used for the growth of only certain biological entities or only biological entities with certain properties (e.g., antibiotic resistance or synthesis of a certain metabolite). A nutrient may include or be a component of differential media to distinguish one type of biological entity from another type of biological entity or other types of biological entities by using biochemical characteristics in the presence of specific indicator (e.g., neutral red, phenol red, eosin y, or methylene blue).

A nutrient may include or be a component of an extract of or media derived from a natural environment. For example, a nutrient may be derived from an environment natural to a particular type of biological entity, a different environment, or a plurality of environments. The environment may include, but is not limited to, one or more of a biological tissue (e.g., connective, muscle, nervous, epithelial, plant epidermis, vascular, ground, etc.), a biological fluid or other biological product (e.g., amniotic fluid, bile, blood, cerebrospinal fluid, cerumen, exudate, fecal matter, gastric fluid, interstitial fluid, intracellular fluid, lymphatic fluid, milk, mucus, rumen content, saliva, sebum, semen, sweat, urine, vaginal secretion, vomit, etc.), a microbial suspension, air (including, e.g., different gas contents), supercritical carbon dioxide, soil (including, e.g., minerals, organic matter, gases, liquids, organisms, etc.), sediment (e.g., agricultural, marine, etc.), living organic matter (e.g., plants, insects, other small organisms and microorganisms), dead organic matter, forage (e.g., grasses, legumes, silage, crop residue, etc.), a mineral, oil or oil products (e.g., animal, vegetable, petrochemical), water (e.g., naturally-sourced freshwater, drinking water, seawater, etc.), and/or sewage (e.g., sanitary, commercial, industrial, and/or agricultural wastewater and surface runoff).

FIG. 1 is a perspective view illustrating a microfabricated device or chip in accordance with some embodiments. Chip 100 includes a substrate shaped in a microscope slide format with injection-molded features on top surface 102. The features include four separate microwell arrays (or microarrays) 104 as well as ejector marks 106. The microwells 113 (spaced by interstitial space 114) in each microarray are arranged in a grid pattern with well-free margins around the edges of chip 100 and between microarrays 104.

FIGS. 2A-2C are top, side, and end views, respectively, illustrating dimensions of chip 100 in accordance with some embodiments.

Figure 3A:
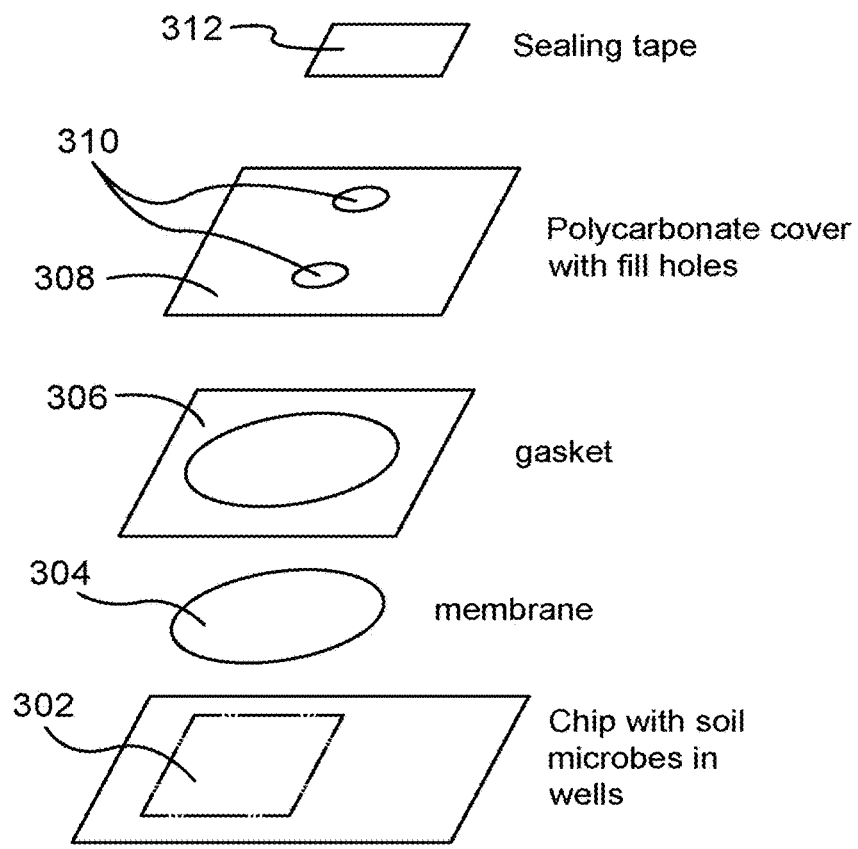
FIGS. 3A and 3B are exploded and top views, respectively, illustrating a microfabricated device or chip in accordance with some embodiments.
Figure 3B:
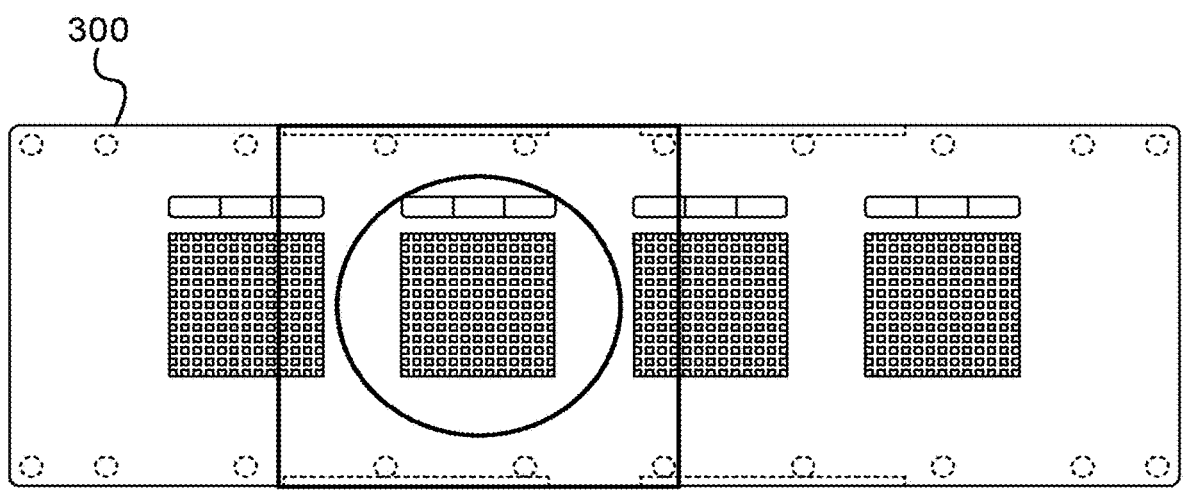

After a sample is loaded on a microfabricated device, a membrane may be applied to at least a portion of a microfabricated device. FIG. 3A is an exploded diagram of the microfabricated device 300 shown from a top view in FIG. 3B in accordance with some embodiments. Device 300 includes a chip with an array of wells 302 holding, for example, soil microbes. A membrane 304 is placed on top of the array of wells 302. A gasket 306 is placed on top of the membrane 304. A cover 308 with fill holes 310 is placed on top of the gasket 306. Finally, sealing tape 312 is applied to the cover 308.

A membrane may be used to seal or cover at least a portion of a microfabricated device including one or more experimental units or microwells. A membrane may be impermeable, semi-permeable, selectively permeable, differentially permeable, and/or partially permeable to allow diffusion of at least one nutrient into the at least one microwell of a high density array of microwells. For example, a membrane may include a natural material and/or a synthetic material.

Figure 4A:
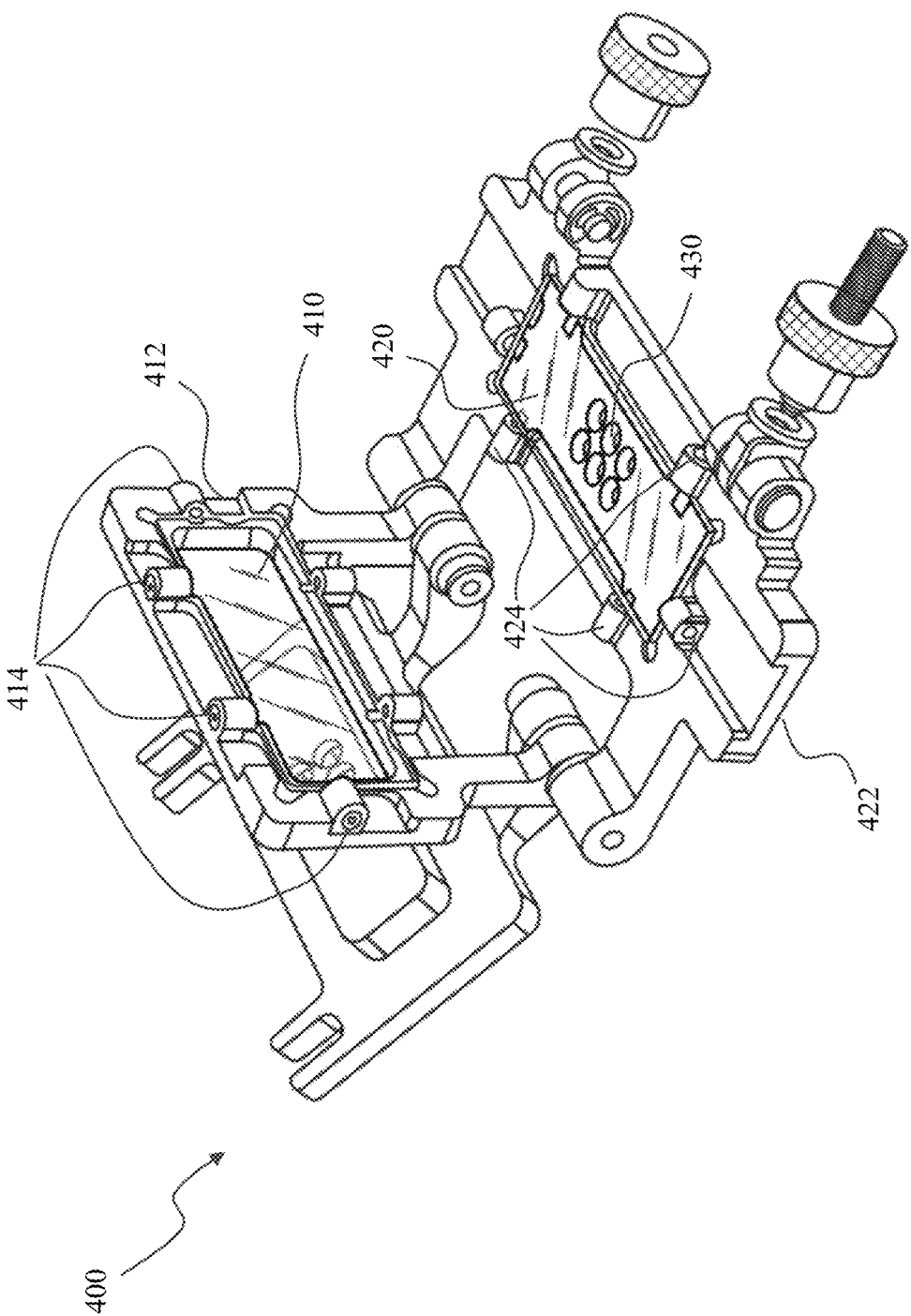
FIG. 4A is an alignment apparatus for aligning a donor array and a receiver array according to some embodiments of the present invention.
Figure 4B:
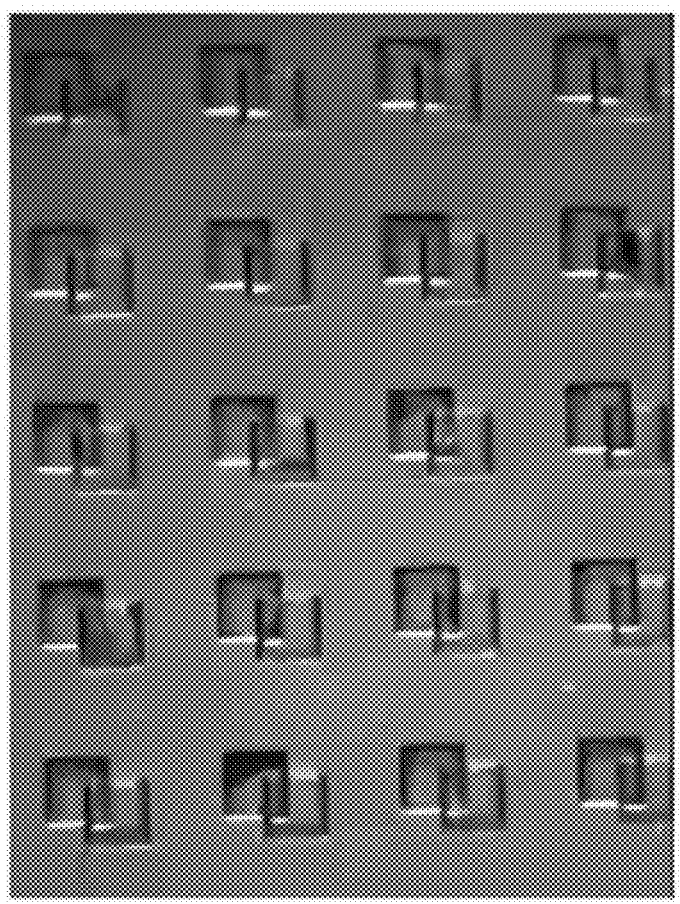
FIG. 4B is a microscopic image showing alignment of microwells of a donor array and a receiver array according to some embodiments of the present invention.

For transfer of microwell contents from a first microfabricated device to a second microfabricated device, precise alignment of the donor and recipient wells is needed. The two devices (or chips) can have same layout or patterns of wells (at least with regard to those wells for which the transfer is intended) when their respective upper surfaces are positioned opposite to each other. This can be accomplished using an alignment apparatus as illustrated in FIG. 4A, where the first chip 410 and the second chip 420 are placed respectively in the upper holder 412 and lower holder 422 of the alignment apparatus. When the upper holder and lower holder are closed, the main surfaces of the first and second chip contact each other. The relative positions of the two devices can be adjusted, e.g., by using alignment screws (as shown in FIG. 4B, 6 screws on the top holder 414 and 6 screws 424 in the bottom holder) or other mechanism known in the art. The alignment can be viewed through the alignment windows using an optical microscope, see FIG. 4B which shows microscope images of microwells of the two stacked microfabricated devices.

The alignment can also be facilitated by including machine vision alignment marks on the two devices, e.g., at predetermined positions of the surface outside the microwell area, the first device may contain a first pattern and the second device contains a complementary pattern (e.g., the mark on the first device takes the "+" shape and the mark on the second device takes a shape of 4 squares arranged in 2 by 2 pattern, the horizontal gap and the vertical gap dimensioned and configured to have a mating correspondence with the "+" shape on the first device). In some embodiments, the size of the microwells on the receiver device can be larger than the corresponding microwells on the donor array, which can make the alignment easier and improve the transfer rate of the well content from the donor device to the receiver device. It is preferred that the alignment be accomplished quickly to minimize evaporation of the liquid from the microwells of either the donor or receiver array.

Once aligned, the first and second devices can be simply used directly for the following procedure (relative position can be maintained by friction between the two devices), or can be affixed by adhesion, clamping, or other known techniques.

When assembled, the first or donor device and the second or receiver device can be positioned such that the interstitial space of the upper surface (the surface portion excluding the microwells) of the first device directly contact the upper surface of the second device. Alternatively, the first device and the second device can be positioned such that the upper surface of the first device and that of the second device is spaced apart with a small gap (the gap needs to be smaller than the dimension of the microwells or the spacing between the microwells such that cross-contamination is minimized). The latter scenario can be accomplished by using spacer or gasket between the two devices, e.g., along peripheral areas of the upper surfaces devoid of microwells. The first or donor device and the second or receiver device after alignment to a fixed position for the follow-on impact transfer are also referred to the "assembly".

Figure 5A:
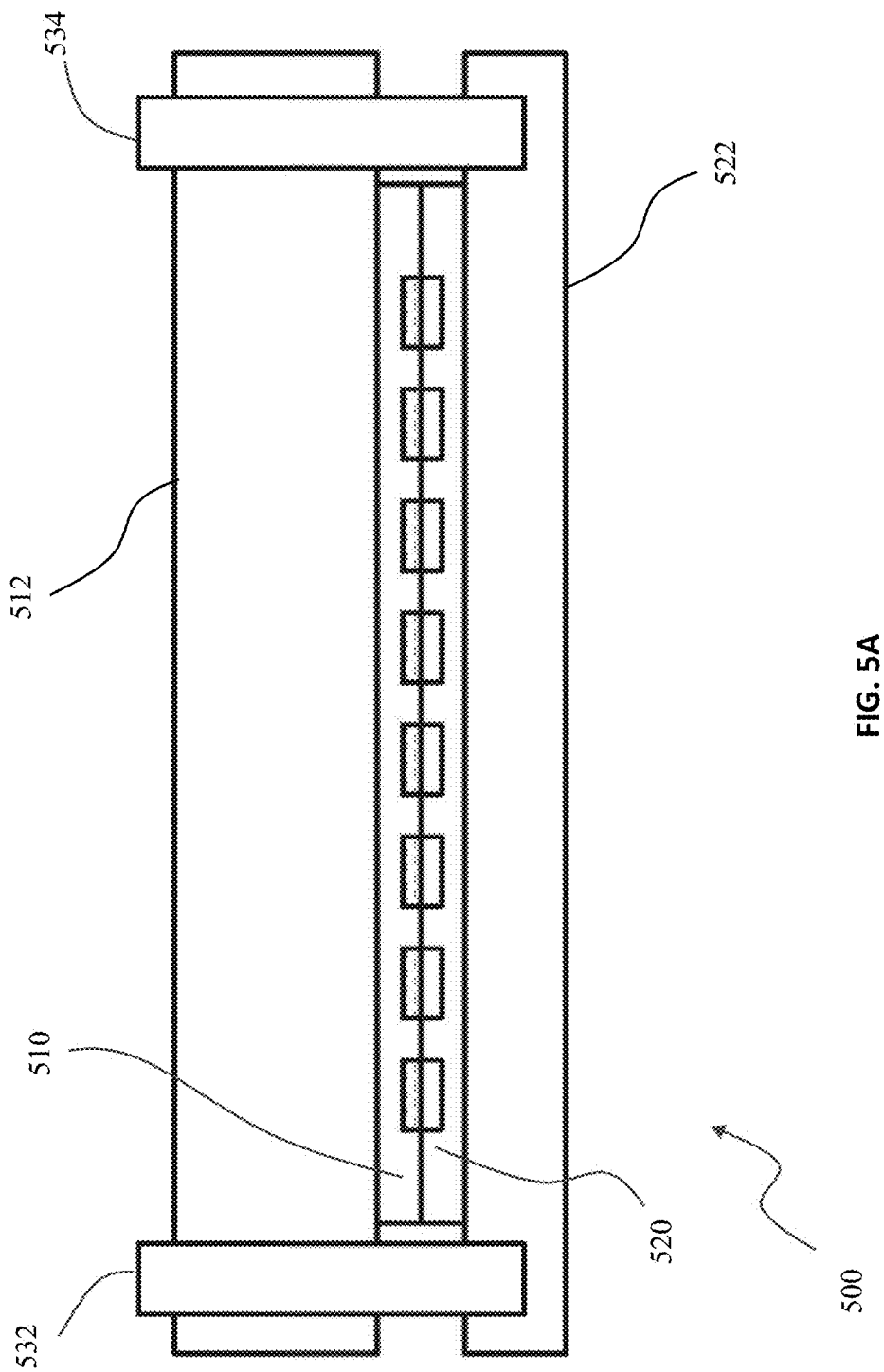
FIG. 5A is an illustrative structure of a mounting structuring in which a donor array and a receiver array are mounted, according to some embodiments of the present invention.

As illustrated in FIG. 5A, the assembly comprising the first device 510 and the second device 520 in a fixed position can be then secured in a mounting structure 500. The mounting structure 500 can include a top piece 512 and a bottom piece 522 coupled by connectors 532 and 534 (e.g., screws or rivets). In this manner, the assembly is sandwiched between the top piece 510 and the bottom piece 520. Well contents in the microwells of the first device 510 can be retained by surface tension, and do not automatically enter the corresponding aligned wells of the second device 520 by gravity.

To allow for greater efficiency of transfer, it is desirable to provide a large inertial force at the deacceleration at the impact. One way to accomplish this end is to reduce the mass of the mounting structure, especially the mass between the assembly and the stopper plate. Thus, in some embodiments, the bottom piece of the mounting structure can be a thin film 522A (attached to the bottom of the second device 520; the donor device 510 is stacked on top of the second device 520), as shown in FIG. 5B. Preferably the thin film is sufficiently rigid to transfer the impact energy into the second device. In some embodiments, the mounting structure does not have a bottom piece but rather has other retaining mechanism, such as retaining hooks or clips 522B as shown in FIG. 5C, to retain the assembly (by friction or otherwise), such that the assembly can directly contact the stopper plate upon impact.

In another embodiment, the mounting structure for the donor and receiver devices can include a clamshell clamp structure consisting of two identical halves. FIG. 6A shows one of the halves of the clam shell 601 (which can be made of metal or a metal alloy), which includes a top thin layer 612 with a central cavity 613 for accommodating a microfabricated device (donor or receiver array), and two spring loaded clips 615. Through holes 630 can be used for optical alignment of the donor and receiver devices as described above. As shown in FIG. 6B, when a microfabricated device 610 is loaded in the cavity 613, the clips 615 are bent, providing the force needed to keep the microfabricated device 610 in place. Another half (not shown) of the clamshell can be similarly loaded with the second (donor or receiver) device, and the two halves can then be combined, with the loaded donor and receiver devices face to face, e.g., by using magnets 614a and 614b shown in FIG. 6A for the needed force to keep the two halves together. It is noted that the thickness of the donor and receiver devices can each be slightly greater than the depth of the cavity 613 (or the thickness of layer 612) such that the facing surfaces of the donor and receiver devices can directly contact each other in the complete clamshell clamp. Then the complete clamshell clamp with the loaded donor and receiver devices can be positioned on an alignment apparatus (such as the one shown and described in connection with FIG. 4A) to precisely align the donor and receiver devices. Then, the clamshell clamp with the loaded donor and receiver devices can be further mounted in a mounting structure as further described below (e.g., those shown in FIGS. 11A, 11B, 13A, 13B, 14A, 14B, where the halves of the clamshell clamp are shown as 1112 and 1122)

Figure 7:
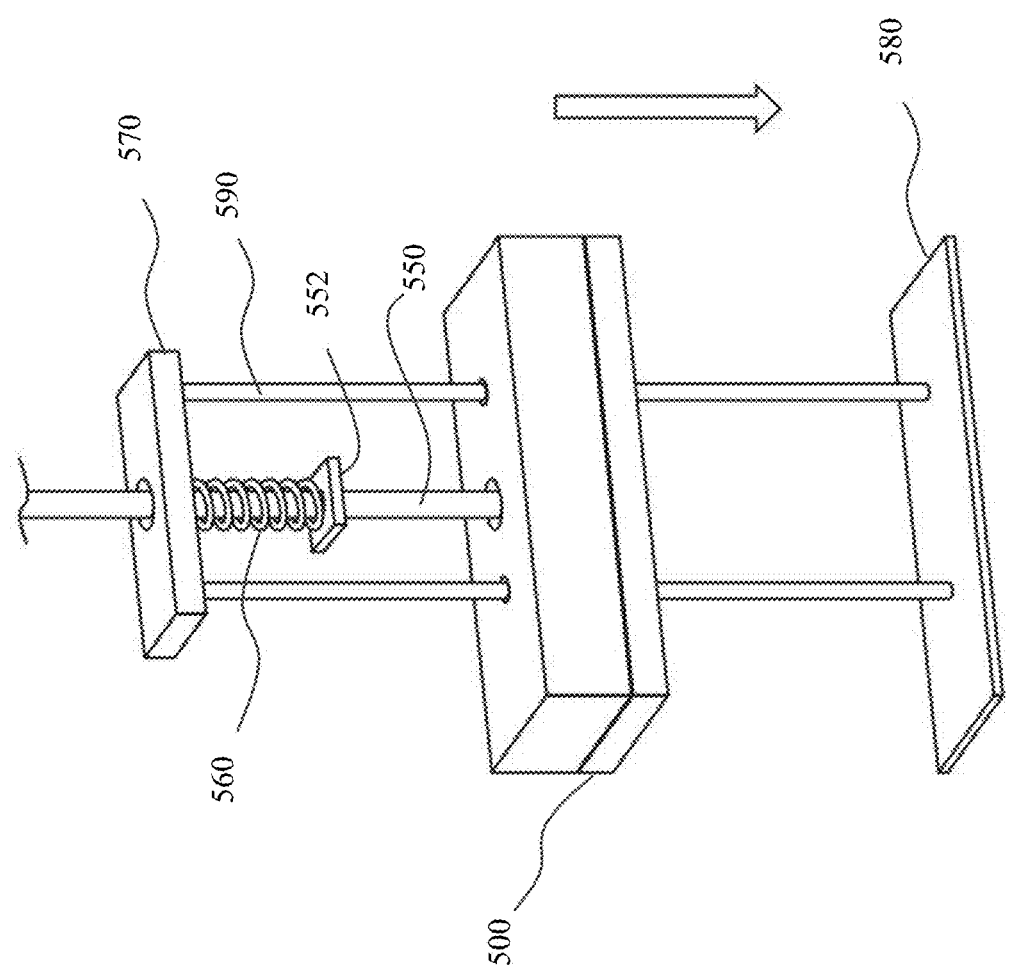
FIG. 7 is a schematic illustration of a portion of an apparatus to transfer material from wells of a donor array to a receiver array, according to some embodiments of the present invention.

In some embodiments, and as illustrated in FIG. 7 and FIGS. 8A-8B, the assembly including the donor and receiver device can be moved in the mounting structure relative to a stopper plate with sufficient speed upon impact on the stopper plate to cause the transfer of material from the wells of the first device to the second device. As shown in FIG. 7 (also referring to FIGS. 8A-8B, where similar elements are annotated with same reference numerals), the mounting structure 500 (loaded with the assembly of the first and second devices, with the first device on top) is connected to a rod 550 which is coupled to a spring 560 which couples to a spring stop 552 on the rod and to a fixed plate 570 on the other end. When the spring 560 is in a compressed state, the mounting structure 500 is spaced apart from the stationary stopper plate 580. When the spring is decompressed (or released), the mounting structure 500 moves down along the guiding rails 590 until impacting the stopper plate 580. Immediately before impact, if the maximum speed of the mounting structure relative to the stopper plate is sufficient, a portion of the well contents in the first device can be transferred to the aligned corresponding wells in the second device due to inertia. By varying this speed (e.g., by varying the degree of the compression of the spring, or the strength or spring constant of the spring), the amount of well contents transferred can also be adjusted. The process can be repeated (e.g., retracting the mounting structure, reloading the spring and then releasing the spring to cause the mounting structure to smash onto the stopper plate) to transfer additional volumes of well contents if desired. It is understood that while a compressed spring is used as an example of the energy source to move the mounting structure, other forms of energy sources (e.g., pneumatic, hydraulic, or electromagnetic forces) can be used, as are known in the state of art. The stopper plate can have an upper surface parallel to the major surfaces of the first device and of the second device at the moment of the impact, and the acceleration/deacceleration of the mounting structure is normal to the upper surface of the stopper plate.

While linear motion of the mounting structure relative to the stopper plate is illustrated herein, other modes of motion between the mounting structure and the stopper plate are contemplated. For example, the mounting structure 500 (with the assembly of donor and receiver devices loaded therein) can be configured to move relative to the stopper plate 680 in a swinging fashion (the mounting structure 500 is installed on a swinging arm 630, which can be rotated about a joint 640 against a stationary arm 650 on which the stopper plate 680 is installed), as shown in FIG. 9.

Figure 11B:
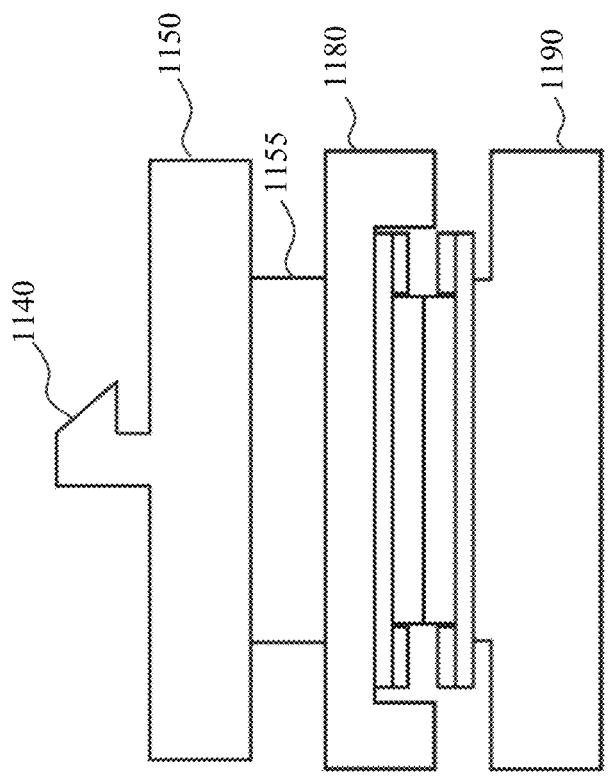
FIGS. 11A and 11B are schematic illustrations of a portion of an apparatus to transfer material from wells of a donor array to a receiver array according to certain embodiments of the present invention, where

In other embodiments, the assembly of the first and second devices can be kept stationary and an impacting device can be used to move toward and impact on the assembly with sufficient speed and/or momentum to effect the transfer of material. An example schematic setup for this embodiment is shown in FIG. 11, which includes an impinging device 1130 comprising an engagement element 1140 (which is to be coupled to a motor to compress and release a leaf spring, described below), a hammer portion 1150, and an integrated anvil portion 1155. The assembly of the donor device 1110 and receiver device 1120 are sandwiched in the clamshell clamp having the top part (or top half) 1112 and bottom part (or bottom half) 1122, which is in turn clamped and tightly secured between holder 1180 and base 1190, which together can be considered as a "mounting structure" 1170 for the assembly. The impinging device 1130 is moved toward the stationary mounting structure 1170, impinging on the holder 1180, which transfers the impact energy to the top part of the clamshell 1112, which then transfers the impact energy to the donor device 1110, resulting in mechanical vibration which is believed to lead to at least partial atomization of the well content of the donor device into aerosols. As a result, at least a portion of the well content in the donor device is transferred onto the receiving surface (or the corresponding aligned microwells) of the receiver device 1120. The relative positions of these elements upon impact are shown in FIG. 11B.

Figure 11A:
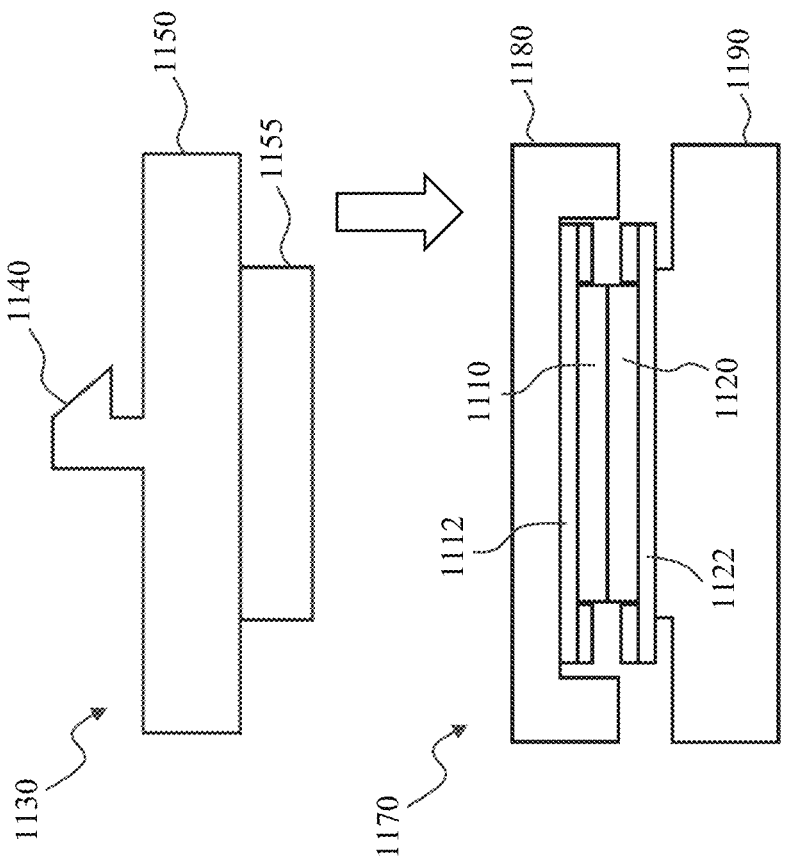
Figure 12:
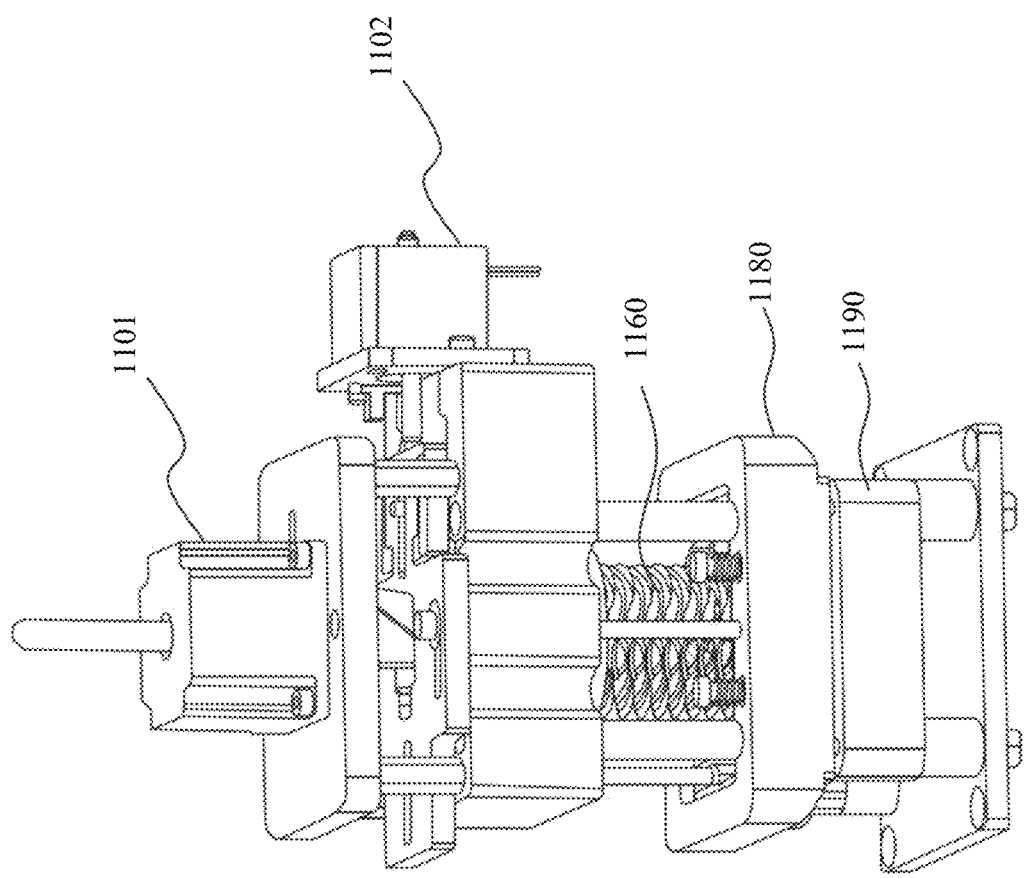
FIG. 12 is a diagram of an apparatus for transferring material from wells of a donor array to a receiver array according to certain embodiments of the present invention.
Figure 13B:
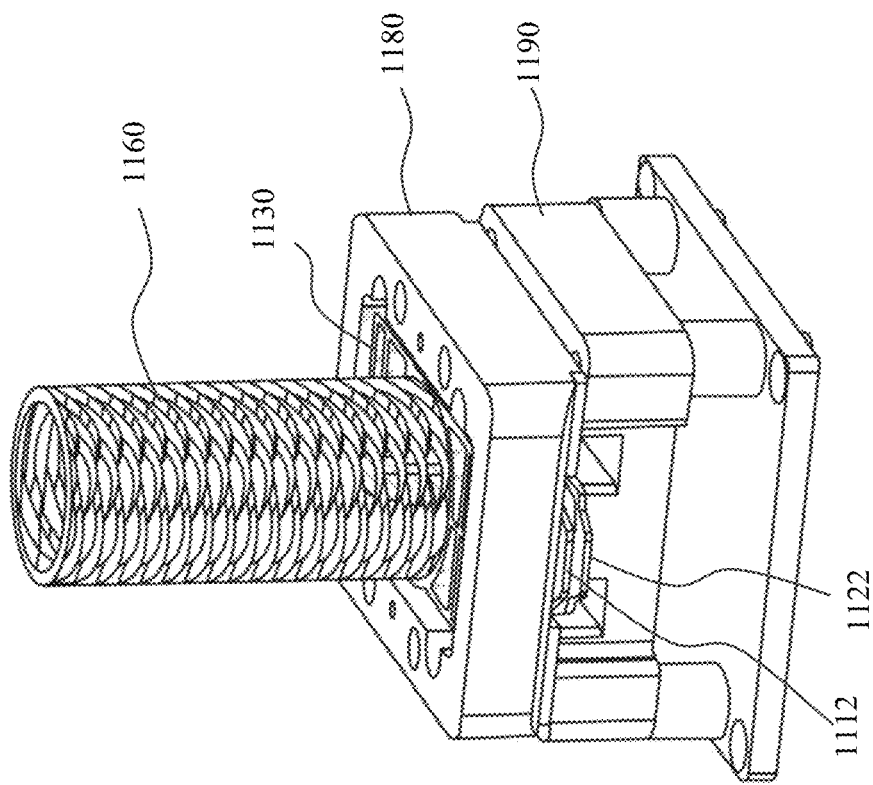
FIGS. 13A and 13B are illustrations of the apparatus shown in FIG. 12 before (13A) and after (13B) impact.
Figure 13A:
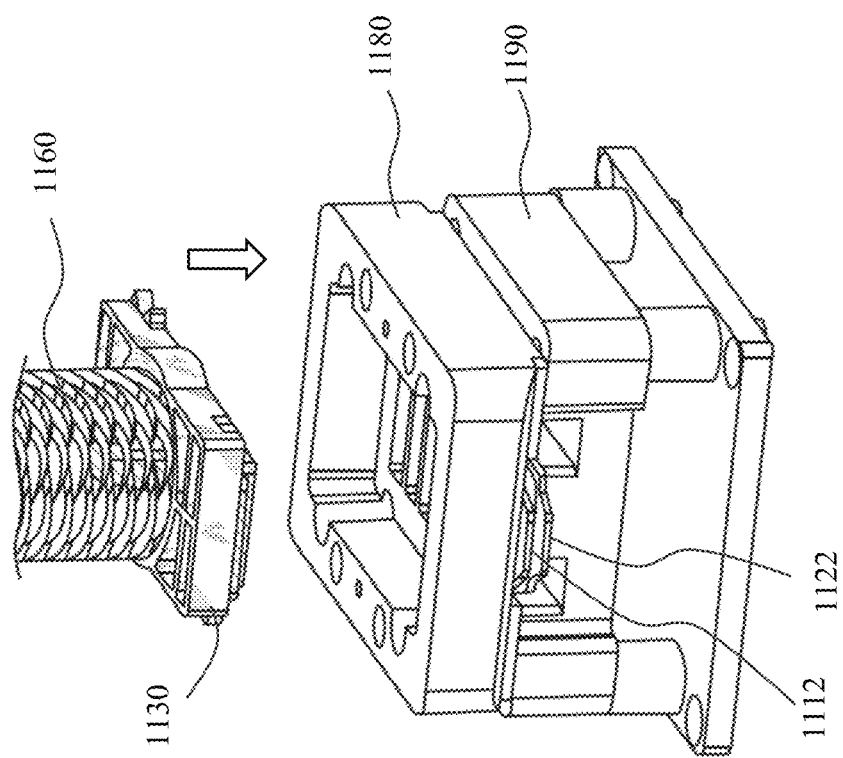

FIGS. 12, 13A and 13B show a schematic configuration of an apparatus implementing the method shown in FIGS. 11A/B. Motor 1101 is used to spring load (elevate or raise) the impinging device by using a shaft (not shown) engaging with the engagement element 1140 shown in FIG. 11A/B, and motor 1102 is used to trigger the release of the engagement between the motor 1101 and the impinging device (e.g., by pushing aside and deflect the shaft). Upon such release, the spring 1160 (e.g., a circular leaf spring as shown) springs from the compressed state to the relaxed state, causing the impinging device 1130 installed at the bottom of the spring 1160 to impact on the holder 1180, which transfers the impacting force to the clamshell clamp 1112/1122 and the donor/receive assembly embedded (not shown in FIG. 12) between the holder 1180 and base 1190. The impacting force/momentum at impingement can be adjusted based on the nature of the well contents to be transferred. For example, more viscous well contents may need greater impacting force for effective transfer.

Figure 14A:
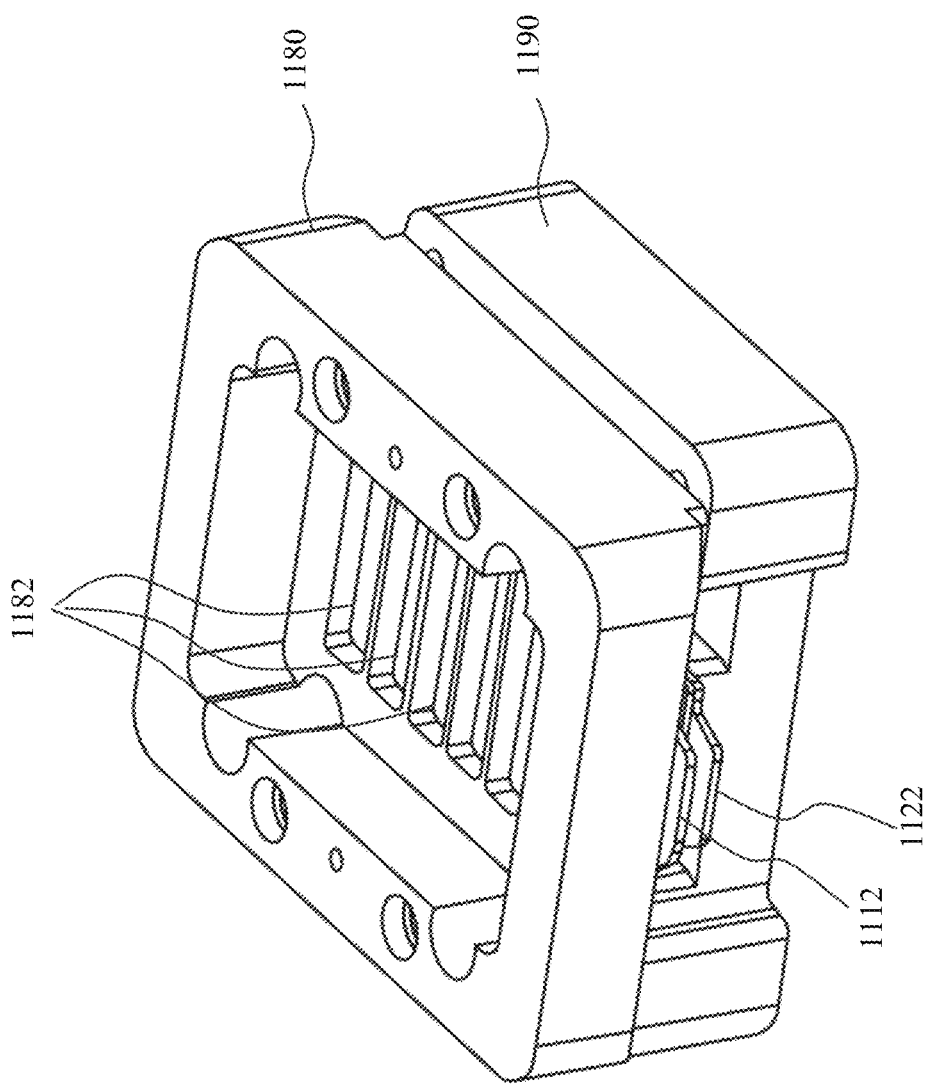
FIG. 14A is a perspective view of a portion of the apparatus shown in FIG. 12.
Figure 14B:
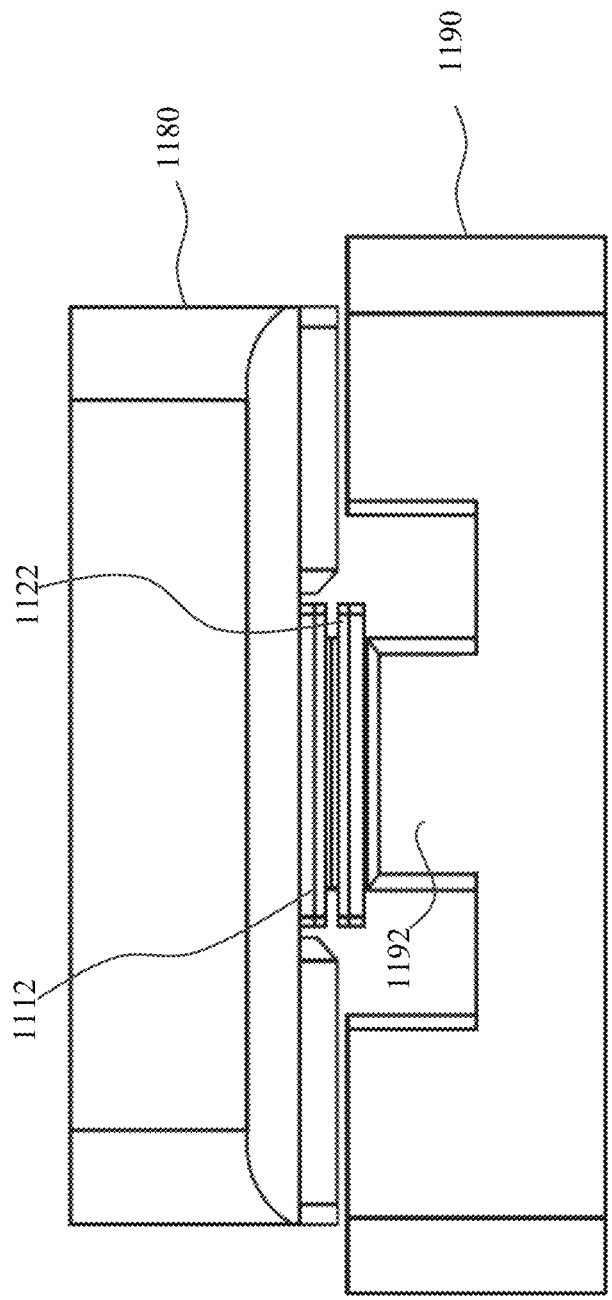
FIG. 14B is a cross sectional view of the portion shown in FIG. 14A.

FIG. 14A is a perspective view of the mounting structure comprising holder 1180 and base 1190, the clamshell clamp 1112/1122 with the mounted donor/receiver chips being sandwiched therebetween. The holder 1180 includes a plurality of parallel-arranged cavities 1182 each having a rectangular cross-section, which forms receiving surfaces to form a mating configuration to accommodate the anvil portion 1155 of the impinging device (see FIG. 15B). It is desirable to keep all the faces of these cavities flat and normal to the direction of the impingement. FIG. 14B is a cross sectional view of the mounting structure comprising holder 1180 and base 1190, the clamshell clamp 1112/1122 with the mounted donor/receiver arrays being sandwiched therebetween. Note the bottom clamshell is placed on a support portion 1192 of the base 1190, and the small gap between the holder 1180 and base 1190 that ensure good contact of donor and receiver devices face to face and that the impact force can be effectively transferred from the bottom portion of the holder 1180 to the clamshell clamp top part 1112 and then to the top donor device.

Figure 15B:
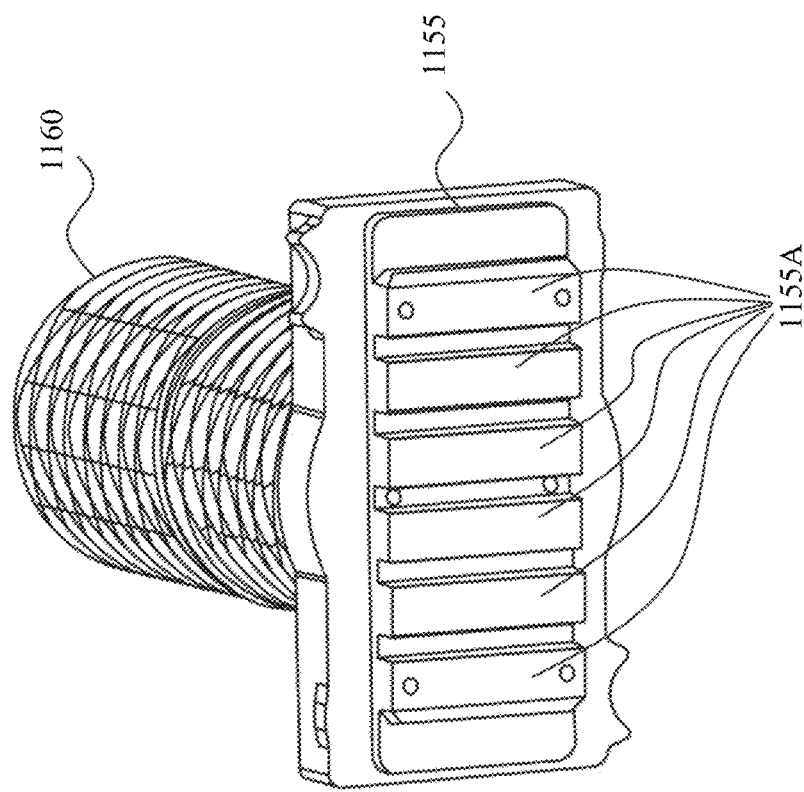
FIG. 15B is a bottom perspective of the portion shown in FIG. 15A.
Figure 15A:
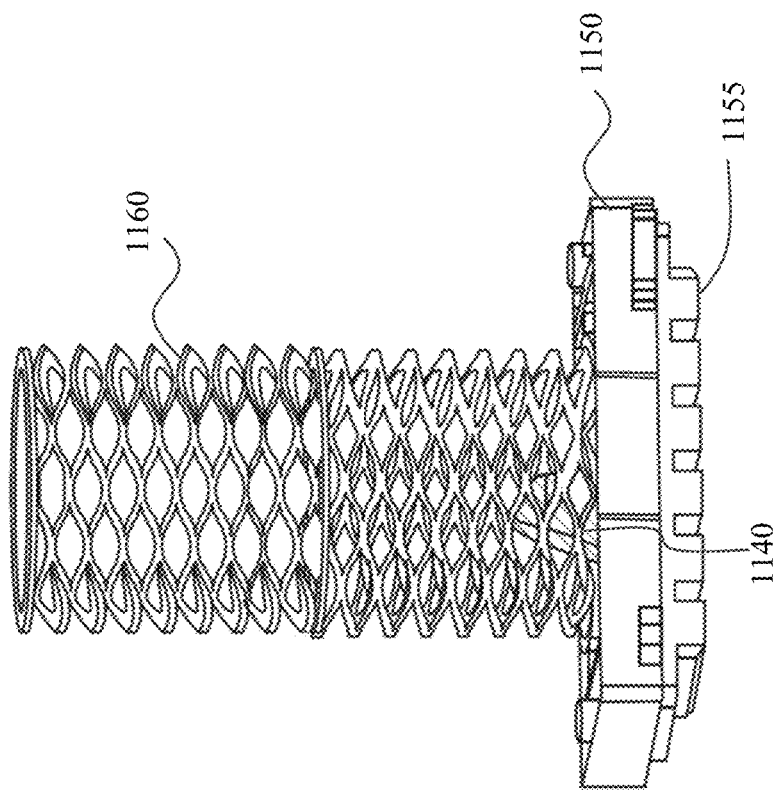
FIG. 15A is a frontal perspective view of a portion of the apparatus shown in FIG. 12.

FIG. 15A is a frontal perspective view of the leaf spring 1160 coupled with the impinging device (note the engagement element 1140 disposed inside of the spring 1160) including the hammer portion 1150 and anvil portion 1155. FIG. 15B is a bottom perspective view of the leaf spring 1160 coupled with the impinging device, where anvil portion 1155 includes a plurality of parallel-arranged protruding sections 1155A which form a mating configuration with the cavities 1182 of the holder 1180. When the anvil portion 1155 contacts the holder 1180, these sections 1155A will contact the bottom surfaces of the cavities 1182 (shown in FIG. 14A). Having the multiple surface sections on the anvil portion of the impinging device and the plurality of corresponding accommodating cavities on the holder 1180 facilitate even distribution of impinging force across the surface of the clamshell and the donor/receiver arrays, and therefore can help to achieve good transfer rates of the material on the entire donor device surface.

Figure 16B:
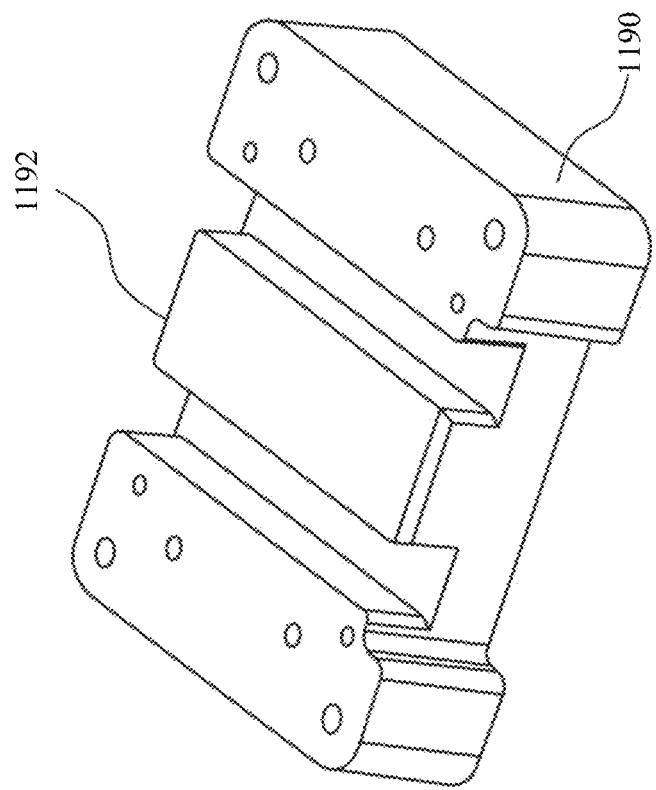
FIG. 16B is a perspective view of a base part of the apparatus shown in FIG. 12.
Figure 16A:
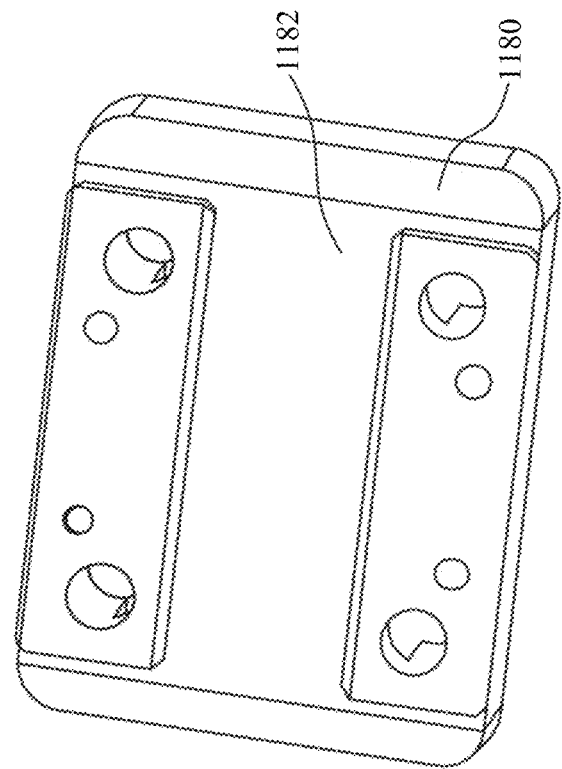
FIG. 16A is a bottom view of a holder part of the apparatus shown in FIG. 12.

FIG. 16A is a bottom view of the holder 1180, where the surface portion 1182 is used to contact the clamshell top half 1112 (also referring to FIGS. 13A/B, 14A/B). FIG. 16B is a top perspective of the base 1190, where the support portion 1192 is used to contact the clamshell bottom half 1122 (also referring to FIGS. 13A/B, 14A/B). For effective transfer of material from the donor device to the receiver device, it is preferred that the surfaces of section 1182 and 1192 are as flat as possible and arranged to be normal to the direction of the impingement.

While in the above examples the impinging device has elaborate structure and bottom surface features to evenly distribute the impact force, and the assembly of the donor/receiver array are mounted in a mounting structure and do not directly contact the impinging device, it is also contemplated that the impinging device and the mounting structure can be configured such that the impinging device can directly impact on the donor device to effect the material transfer.

In any of the embodiments describe herein, the relative positions of the first (donor) device and the second (receiver) device can be switched without substantially affecting the results of the material transfer. For example, for the transfer apparatus schematically shown in FIGS. 7/8A/8B, the donor device can be placed on top of the receiver device, or the donor device can be placed at the bottom of the receiver device (i.e., first and second device shown in FIGS. 5A-5C can be switched). Similarly, in FIGS. 11A/B, 13A/13B, 14A/B, the relative position of the donor device and receiver device can also be flipped without changing other structures or operating procedure of the transfer apparatus. Based on the results observed, it is believed that the transfer is effected by the vibration of the donor device caused by the impact which at least partially atomizes the liquid contained in the microwells of the donor array into droplets or aerosols (if there's liquid in the receiver array then it will also be atomized), some of which would deposit onto the surface or wells of the receiver device when the vibration stops, therefore as long as the donor device and receiver device are held tightly together and the opposing contact surfaces form good contact before the impact, the transfer will be insensitive to which side the impact comes from, and the transfer tends to split some of the well content of the donor device into the receiver device rather than a complete of transfer of material from the donor device to receiver device. This is different from the transfer of a macroscopic solid object as a result of its tendency of continued movement due to inertia.

Example 1

In this example, a transfer method of the present disclosure was used to successfully transfer live microbial cells from microwells of an array to a second device. The original array was resealed for later use. The transferred material on the second device was then examined by Gram staining. Examples of each type were recovered from the original array, grown and tested to confirm their Gram status.

A soil sample (San Carlos soil) was prepared in R2A and loaded into microwells within a small area on the surface of the array (a rectangle of 16×20 microwells at the center of the array, each microwell having a roughly square cross section with a side length of about 150 microns and spacing between neighboring microwells is about 425 microns). The sample was diluted so that only 5-10% of the microwells show growth (likely pure strains in such microwells). A membrane was applied to the array to seal the well contents. The array was incubated at room temperature for three days after which time good growth was observed. The array (with the cultivated well contents) was imaged by a digital camera, and the image data was stored.

Figure 10:
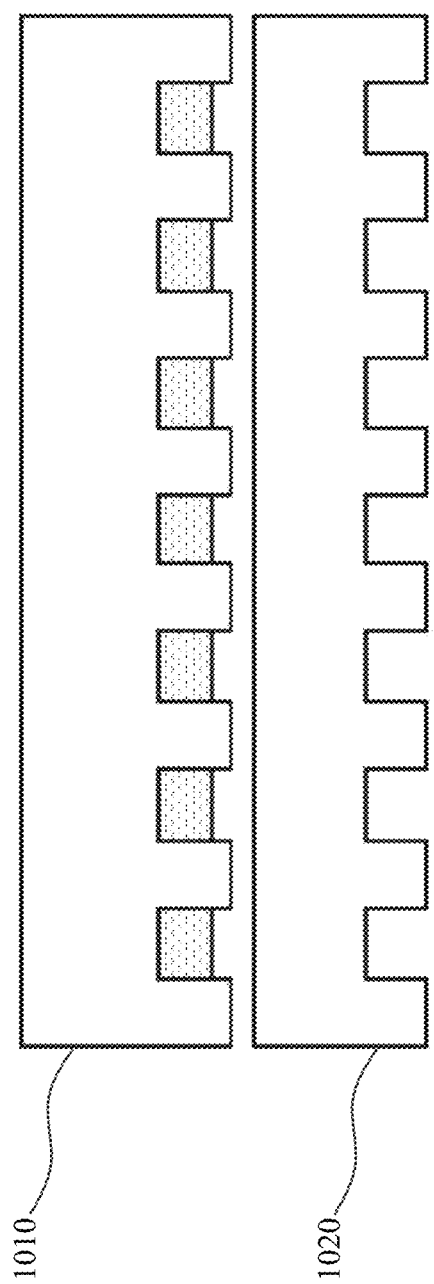
FIG. 10 is a schematic setup of a donor array and a receiver array before transfer, wherein the back side of the receiver array is used as the receiving surface for the transferred material, according to some embodiments of the present invention.

Then the membrane was removed from the array. A second array was used as the recipient device ($2^{nd}$ device). In this example, the back flat side of the second array was used as the receiving surface (illustrated in FIG. 10; the gap between the two arrays is shown to clearly distinguish the two arrays; when they are assembled the gap is closed). The first array 1010 and the second array 1020 were aligned by stacking them in a cassette, and then were taped together (with no gap between them).

The two arrays are loaded onto a mounting structure which were accelerated and slammed onto a stopper plate, as illustrated in FIGS. 7 and 8A-8B. Multiple repeated impacts were performed. After the transfer, the original array was re-sealed with a membrane, and the resealed array was imaged. The array was then incubated for an additional 24-48 hours and imaged again. It was confirmed that there was no cross-contamination of microwell contents in the original array.

Gram staining was performed on the receiving surface of the second array. A Gram stain kit (Microscope.com) was used. The staining procedure was: (1) Heat fixing the array for 3 min at 100 □ in an oven; (2) Add crystal violet, wait 1 min, wash; (3) Add iodine, wait 30 s, wash; (4) Decolorize with solvent (acetone/alcohol) and wash immediately; (5) Add saffronin, wait 1 min, wash; and (6) Examine under microscope. Gram positive bacteria would take up the crystal violet stain and get fixed by iodine and look purple. Gram negative bacteria wouldn't hold the violet stain when the decolorizer is applied, and would look red from saffronin.

The locational information on the transfer surface of the second array needs to be preserved and mapped back to the original array. This can be accomplished by observing the traces of a grid on the transfer surface left from the original array. Also, the microscope can be focused first on the stained bacteria spot on the transfer surface, then focused (deeper) on the empty microwells of the second array, and based on the correspondence of the bacteria spots and the empty well locations, the source microwell on the original array can be located. Fiducial marks can also be introduced to the second array at locations with known correlation with the microwells on the original array before the transfer, which can be used to map the observed bacteria spots back to the microwells on the original array.

Based on the stain result on the transfer surface (either positive or negative Gram bacteria), corresponding locations of the microwells on the original array were identified, and the remaining microwell contents in these microwells were picked and transferred to wells of a 96-well plate, cultivated, and analyzed by Gram staining. The staining results were consistent with the staining result of the second array.

Example 2

Figure 17A:
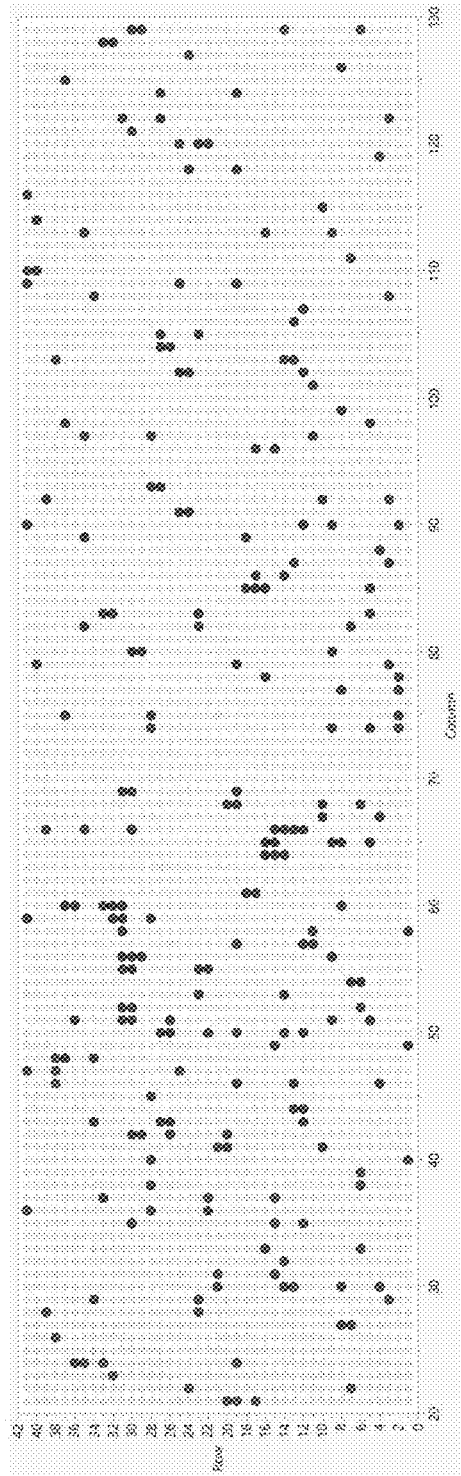
FIG. 17A is an image showing active cell colonies on a donor array.
Figure 17B:
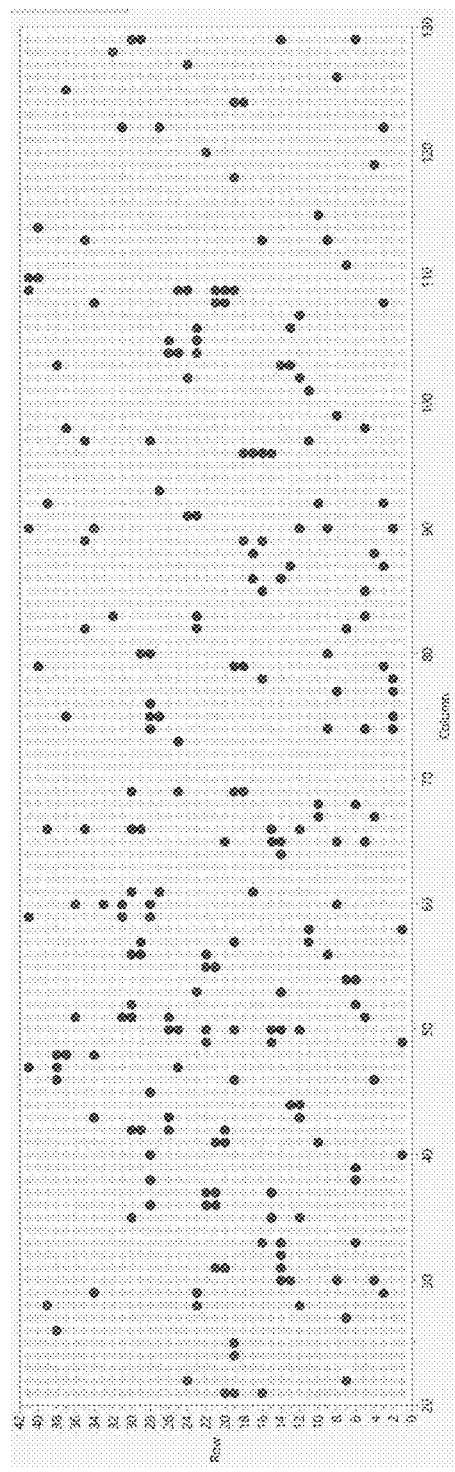
FIG. 17B is an image showing active cell colonies on a receiver array after transfer of the well contents from the donor array shown in FIG. 17A.

In this example, single cell colonies of *S. marcescens* (by dilution of cells and Poisson loading into the microwells) were cultivated using media R2A in microwells of a microfabricated chip using resazurin as metabolic activity indicator (see FIG. 17A, where dark dots signify active single cell colonies). The microwells of an identical receiver microfabricated device are not loaded with cells, but preloaded with R2A media and resazurin. The clamshell as illustrated in FIGS. 6A-6B was used to mount the microfabricated devices, and the transfer apparatus and associated method described in connection with FIGS. 11-17 were used to transfer well contents from the donor chip to the receiver chip. 65 lb spring force is used (5.0 J potential energy). After the transfer, the receiver chip is visualized, see FIG. 17B. In a number of runs, the results show over 90% of successful transfer of the colonies from the microwells of the donor chip to the corresponding microwells of the receiver chip.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of transferring material from a first device comprising an upper surface including a first array of microwells to a second device comprising an upper surface, wherein at least one of the first array of microwells contain at least one cell, the method comprising:
   securing an assembly comprising the first device and the second device in a mounting structure, wherein the first device and the second device are positioned in a way that the upper surface of the second device is opposite the upper surface of the first device and the relative positions of the first device and the second device are fixed; and
   moving the mounting structure carrying the first device and the second device toward a stopper plate, the stopper plate having an initial position apart from the mounting structure, until the assembly or a part of the mounting structure contacts the stopper plate, wherein the speed of the mounting structure immediately before the contact is sufficient to cause the transfer of at least a portion of the well content of the at least one of the first array of microwells of the first device to the upper surface of the second device.

2. A method of transferring material from a first device comprising an upper surface including a first array of microwells to a second device comprising an upper surface, wherein at least one of the first array of microwells contain at least one cell, the method comprising:
   securing an assembly comprising the first device and the second device in a mounting structure, wherein the first device and the second device are positioned in a way that the upper surface of the second device is opposite the upper surface of the first device and the relative positions of the first device and the second device are fixed; and
   moving an impinging device toward the assembly, wherein the impinging device has an initial position apart from the assembly, until the impinging device contacts the assembly or a part of the mounting structure, wherein the momentum of the impinging device immediately before the contact is sufficient to cause the transfer of at least a portion of the well content of the at least one of the first array of microwells of the first device to the upper surface of the second device.

3. The method of claim 1, wherein the upper surface of the second device comprises a second array of microwells, wherein securing the assembly further comprises aligning at least one microwell of the first array of microwells of the first device with at least one microwell of the second array of microwells of the second device.

4. The method of claim 1, wherein the upper surface of the second device comprises a conducting substrate.

5. The method of claim 4, wherein the upper surface of the second device further comprises a MALDI matrix material deposited on top of the conducting substrate.

6. The method of claim 1, wherein the content in the at least one of the first array of microwells of the first device comprises liquid and a plurality of cells.

7. The method of claim 1, wherein the mounting structure is configured such that moving the mounting structure toward the stopper plate causes direct contact between the second device with the stopper plate.

8. The method of claim 1, wherein at least a part of the mounting structure is slidable along a guide rail, and wherein moving the assembly comprises moving the assembly along the guide rail.

9. The method of claim 1, wherein the mounting structure is configured to be movable along a curve toward the stopper plate.

10. The method of claim 1, wherein positioning the first device and the second device comprises contacting the upper surface of the first device with the upper surface of the second device.

11. The method of claim 1, wherein the surface density of the first array of microwells is at least 150 microwells per $cm^2$, at least 250 microwells per $cm^2$, at least 400 microwells per $cm^2$, at least 500 microwells per $cm^2$, at least 750 microwells per $cm^2$, at least 1,000 microwells per $cm^2$, at least 2,500 microwells per $cm^2$, at least 5,000 microwells per $cm^2$, at least 7,500 microwells per $cm^2$, at least 10,000 microwells per $cm^2$, at least 50,000 microwells per $cm^2$, at least 100,000 microwells per $cm^2$, or at least 160,000 per $cm^2$.

12. The method of claim 1, wherein each microwell of the first array of microwells of the first device has a diameter of from about 5 μm to about 500 μm, from about 10 μm to about 300 μm, or from about 20 μm to about 200 μm.

13. The method of claim 2, wherein the upper surface of the second device comprises a second array of microwells, wherein securing the assembly further comprises aligning at least one microwell of the first array of microwells of the first device with at least one microwell of the second array of microwells of the second device.

14. The method of claim 2, wherein the upper surface of the second device comprises a conducting substrate.

15. The method of claim 14, wherein the upper surface of the second device further comprises a MALDI matrix material deposited on top of the conducting substrate.

16. The method of claim 2, wherein the content in the at least one of the first array of microwells of the first device comprises liquid and a plurality of cells.

17. The method of claim 2, wherein positioning the first device and the second device comprises contacting the upper surface of the first device with the upper surface of the second device.

18. The method of claim 2, wherein the surface density of the first array of microwells is at least 150 microwells per cm², at least 250 microwells per cm², at least 400 microwells per cm², at least 500 microwells per cm², at least 750 microwells per cm², at least 1,000 microwells per cm², at least 2,500 microwells per cm², at least 5,000 microwells per cm², at least 7,500 microwells per cm², at least 10,000 microwells per cm², at least 50,000 microwells per cm², at least 100,000 microwells per cm², or at least 160,000 per cm².

19. The method of claim 2, wherein each microwell of the first array of microwells of the first device has a diameter of from about 5 μm to about 500 μm, from about 10 μm to about 300 μm, or from about 20 μm to about 200 μm.

* * * * *